(12) United States Patent  
Kuo

(10) Patent No.: US 12,178,678 B2
(45) Date of Patent: *Dec. 31, 2024

(54) METHOD AND A SYSTEM USABLE IN CREATING A SUBSEQUENT DENTAL APPLIANCE

(71) Applicant: Align Technology, Inc., San Jose, CA (US)

(72) Inventor: Eric Kuo, San Jose, CA (US)

(73) Assignee: ALIGN TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/874,160

(22) Filed: Jul. 26, 2022

(65) Prior Publication Data

US 2023/0157788 A1 May 25, 2023

Related U.S. Application Data

(63) Continuation of application No. 16/200,445, filed on Nov. 26, 2018, now Pat. No. 11,432,907, which is a continuation of application No. 13/605,949, filed on Sep. 6, 2012, now abandoned.

(51) Int. Cl.
*A61C 7/00* (2006.01)
*A61C 9/00* (2006.01)
*A61C 7/14* (2006.01)
*A61C 7/20* (2006.01)

(52) U.S. Cl.
CPC ............ *A61C 7/002* (2013.01); *A61C 9/0046* (2013.01); *A61C 7/00* (2013.01); *A61C 7/008* (2013.01); *A61C 7/146* (2013.01); *A61C 7/20* (2013.01); *F04C 2270/041* (2013.01)

(58) Field of Classification Search
CPC ......... A61C 7/002; A61C 9/0046; A61C 7/00; A61C 7/008; A61C 7/146; A61C 7/20; F04C 2270/041
See application file for complete search history.

(56) References Cited

U.S. PATENT DOCUMENTS

| | | | |
|---|---|---|---|
| 5,820,368 A | 10/1998 | Wolk | |
| 6,386,864 B1 | 5/2002 | Kuo | |
| 6,454,565 B2 | 9/2002 | Phan et al. | |
| 6,471,511 B1 | 10/2002 | Chishti et al. | |
| 6,607,382 B1 | 8/2003 | Kuo et al. | |
| 6,783,604 B2 | 8/2004 | Tricca | |
| 6,790,035 B2 | 9/2004 | Tricca et al. | |
| 6,814,574 B2 | 11/2004 | Abolfathi et al. | |

(Continued)

*Primary Examiner* — Kibrom K Gebresilassie
(74) *Attorney, Agent, or Firm* — Wilson Sonsini Goodrich & Rosati

(57) ABSTRACT

A current digital dental model is received that includes a representation of the set of physical teeth for the patient with the current dental appliance attached to the physical teeth or oral cavity. The current digital dental model is a direct digital scan of the set of physical teeth and the current dental appliance. The physical teeth are at a position in treatment when all or a part of the current dental appliance is desired to be removed from one or more of the set of physical teeth and it is desired to use a subsequent appliance. The current digital dental model is created based a new digital dental model that includes the representation of the set of physical teeth without including the current dental appliance.

20 Claims, 15 Drawing Sheets

(56) References Cited

U.S. PATENT DOCUMENTS

| | | |
|---|---|---|
| 6,830,450 B2 | 12/2004 | Knopp et al. |
| 6,947,038 B1 | 9/2005 | Anh et al. |
| 7,074,039 B2 | 7/2006 | Kopelman et al. |
| 7,104,792 B2 | 9/2006 | Taub et al. |
| 7,121,825 B2 | 10/2006 | Chishti et al. |
| 7,160,107 B2 | 1/2007 | Kopelman et al. |
| 7,192,273 B2 | 3/2007 | McSurdy, Jr. |
| 7,347,688 B2 | 3/2008 | Kopelman et al. |
| 7,354,270 B2 | 4/2008 | Abolfathi et al. |
| 7,448,514 B2 | 11/2008 | Wen |
| 7,481,121 B1 | 1/2009 | Cao |
| 7,543,511 B2 | 6/2009 | Kimura et al. |
| 7,553,157 B2 | 6/2009 | Abolfathi et al. |
| 7,600,999 B2 | 10/2009 | Knopp |
| 7,766,658 B2 | 8/2010 | Tricca et al. |
| 7,771,195 B2 | 8/2010 | Knopp et al. |
| 7,854,609 B2 | 12/2010 | Chen et al. |
| 7,871,269 B2 | 1/2011 | Wu et al. |
| 7,878,801 B2 | 2/2011 | Abolfathi et al. |
| 7,878,805 B2 | 2/2011 | Moss et al. |
| 7,883,334 B2 | 2/2011 | Li et al. |
| 7,914,283 B2 | 3/2011 | Kuo |
| 7,947,508 B2 | 5/2011 | Tricca et al. |
| 8,152,518 B2 | 4/2012 | Kuo |
| 8,172,569 B2 | 5/2012 | Matty et al. |
| 8,235,715 B2 | 8/2012 | Kuo |
| 8,292,617 B2 | 10/2012 | Brandt et al. |
| 8,337,199 B2 | 12/2012 | Wen |
| 8,517,726 B2 | 8/2013 | Kakavand et al. |
| 8,562,337 B2 | 10/2013 | Kuo et al. |
| 8,641,414 B2 | 2/2014 | Borovinskih et al. |
| 8,684,729 B2 | 4/2014 | Wen |
| 8,708,697 B2 | 4/2014 | Li et al. |
| 8,758,009 B2 | 6/2014 | Chen et al. |
| 8,771,149 B2 | 7/2014 | Rahman et al. |
| 8,899,976 B2 | 12/2014 | Chen et al. |
| 8,899,977 B2 | 12/2014 | Cao et al. |
| 8,936,463 B2 | 1/2015 | Mason et al. |
| 8,936,464 B2 | 1/2015 | Kopelman |
| 9,022,781 B2 | 5/2015 | Kuo et al. |
| 9,119,691 B2 | 9/2015 | Namiranian et al. |
| 9,241,774 B2 | 1/2016 | Li et al. |
| 9,326,831 B2 | 5/2016 | Cheang |
| 9,433,476 B2 | 9/2016 | Khardekar et al. |
| 9,610,141 B2 | 4/2017 | Kopelman et al. |
| 9,655,691 B2 | 5/2017 | Li et al. |
| 9,675,427 B2 | 6/2017 | Kopelman |
| 9,700,385 B2 | 7/2017 | Webber |
| 9,744,001 B2 | 8/2017 | Choi et al. |
| 9,844,424 B2 | 12/2017 | Wu et al. |
| 10,045,835 B2 | 8/2018 | Boronkay et al. |
| 10,111,730 B2 | 10/2018 | Webber et al. |
| 10,150,244 B2 | 12/2018 | Sato et al. |
| 10,201,409 B2 | 2/2019 | Mason et al. |
| 10,213,277 B2 | 2/2019 | Webber et al. |
| 10,299,894 B2 | 5/2019 | Tanugula et al. |
| 10,363,116 B2 | 7/2019 | Boronkay |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,406 B2 | 1/2020 | Wu et al. |
| 10,537,463 B2 | 1/2020 | Kopelman |
| 10,548,700 B2 | 2/2020 | Fernie |
| 10,555,792 B2 | 2/2020 | Kopelman et al. |
| 10,588,776 B2 | 3/2020 | Cam et al. |
| 10,613,515 B2 | 4/2020 | Cramer et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,874,483 B2 | 12/2020 | Boronkay |
| 10,881,487 B2 | 1/2021 | Cam et al. |
| 10,912,629 B2 | 2/2021 | Tanugula et al. |
| 10,959,810 B2 | 3/2021 | Li et al. |
| 10,993,783 B2 | 5/2021 | Wu et al. |
| 11,026,768 B2 | 6/2021 | Moss et al. |
| 11,026,831 B2 | 6/2021 | Kuo |
| 11,045,282 B2 | 6/2021 | Kopelman et al. |
| 11,045,283 B2 | 6/2021 | Riley et al. |
| 11,103,330 B2 | 8/2021 | Webber et al. |
| 11,123,156 B2 | 9/2021 | Cam et al. |
| 11,154,382 B2 | 10/2021 | Kopelman et al. |
| 11,166,788 B2 | 11/2021 | Webber |
| 11,174,338 B2 | 11/2021 | Liska et al. |
| 11,219,506 B2 | 1/2022 | Shanjani et al. |
| 11,259,896 B2 | 3/2022 | Matov et al. |
| 11,273,011 B2 | 3/2022 | Shanjani et al. |
| 11,278,375 B2 | 3/2022 | Wang et al. |
| 11,318,667 B2 | 5/2022 | Mojdeh et al. |
| 11,331,166 B2 | 5/2022 | Morton et al. |
| 11,344,385 B2 | 5/2022 | Morton et al. |
| 11,376,101 B2 | 7/2022 | Sato et al. |
| 11,419,702 B2 | 8/2022 | Sato et al. |
| 11,419,710 B2 | 8/2022 | Mason et al. |
| 11,471,253 B2 | 10/2022 | Venkatasanthanam et al. |
| 11,497,586 B2 | 11/2022 | Kopelman |
| 11,504,214 B2 | 11/2022 | Wu et al. |
| 11,523,881 B2 | 12/2022 | Wang et al. |
| 11,534,268 B2 | 12/2022 | Li et al. |
| 11,534,974 B2 | 12/2022 | O'Leary et al. |
| 11,554,000 B2 | 1/2023 | Webber |
| 11,564,777 B2 | 1/2023 | Kopelman et al. |
| 11,571,278 B2 | 2/2023 | Kopelman et al. |
| 11,571,279 B2 | 2/2023 | Wang et al. |
| 11,576,750 B2 | 2/2023 | Kopelman et al. |
| 11,576,752 B2 | 2/2023 | Morton et al. |
| 11,589,955 B2 | 2/2023 | Medvinskaya et al. |
| 11,596,502 B2 | 3/2023 | Webber et al. |
| 11,602,414 B2 | 3/2023 | Sato et al. |
| 11,642,194 B2 | 5/2023 | Boronkay et al. |
| 11,642,198 B2 | 5/2023 | Kopelman et al. |
| 11,666,415 B2 | 6/2023 | Wang et al. |
| 11,701,203 B2 | 7/2023 | Makarenkova et al. |
| 11,737,857 B2 | 8/2023 | Derakhshan et al. |
| 11,779,243 B2 | 10/2023 | Li et al. |
| 11,779,437 B2 | 10/2023 | Cam et al. |
| 11,793,606 B2 | 10/2023 | Cam et al. |
| 2002/0192617 A1 | 12/2002 | Phan et al. |
| 2004/0166462 A1 | 8/2004 | Phan et al. |
| 2004/0166463 A1 | 8/2004 | Wen et al. |
| 2005/0014105 A1 | 1/2005 | Abolfathi et al. |
| 2005/0186524 A1 | 8/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0115782 A1 | 6/2006 | Li et al. |
| 2006/0115785 A1 | 6/2006 | Li et al. |
| 2006/0199142 A1 | 9/2006 | Liu et al. |
| 2006/0234179 A1 | 10/2006 | Wen et al. |
| 2008/0118882 A1 | 5/2008 | Su |
| 2008/0160473 A1 | 7/2008 | Li et al. |
| 2008/0286716 A1 | 11/2008 | Sherwood |
| 2008/0286717 A1 | 11/2008 | Sherwood |
| 2008/0318179 A1* | 12/2008 | Liu .................. A61C 7/00 433/24 |
| 2009/0280450 A1 | 11/2009 | Kuo |
| 2010/0009308 A1* | 1/2010 | Wen .................. A61C 7/08 700/118 |
| 2010/0055635 A1 | 3/2010 | Kakavand |
| 2010/0129763 A1 | 5/2010 | Kuo |
| 2011/0004331 A1* | 1/2011 | Cinader, Jr. ........... B33Y 80/00 700/98 |
| 2011/0269092 A1 | 11/2011 | Kuo et al. |
| 2016/0193014 A1 | 7/2016 | Morton et al. |
| 2017/0007359 A1 | 1/2017 | Kopelman et al. |
| 2017/0135793 A1 | 5/2017 | Webber et al. |
| 2018/0360567 A1 | 12/2018 | Xue et al. |
| 2019/0046297 A1 | 2/2019 | Kopelman et al. |
| 2019/0099129 A1 | 4/2019 | Kopelman et al. |

(56) References Cited

U.S. PATENT DOCUMENTS

| | | |
|---|---|---|
| 2019/0262101 A1 | 8/2019 | Shanjani et al. |
| 2019/0298494 A1 | 10/2019 | Webber et al. |
| 2020/0155276 A1 | 5/2020 | Cam et al. |
| 2020/0188062 A1 | 6/2020 | Kopelman et al. |
| 2021/0147672 A1 | 5/2021 | Cole et al. |

* cited by examiner

1030

SUPERIMPOSE EACH OF SEGMENTED DIGITAL TEETH OF THE PATIENT ON CORRESPONDING DIGITAL TEETH ASSOCIATED WITH THE CURRENT DIGITAL TEETH MODEL, WHEREIN THE SEGMENTED DIGITAL TEETH ARE DERIVED FROM THE SET OF PHYSICAL TEETH WITHOUT ANY DENTAL APPLIANCE APPLIED TO THE SET OF PHYSICAL TEETH
1120

DETERMINE A NON-SUPERIMPOSED PORTION OF THE CURRENT DIGITAL TEETH MODEL BASED ON THE SUPERIMPOSING
1130

CREATE THE NEW DIGITAL TEETH MODEL BY REMOVING THE NON-SUPERIMPOSED PORTION OF THE CURRENT DIGITAL TEETH MODEL
1140

SUPERIMPOSE A SECOND REPRESENTATION OF ALL OR A PORTION OF THE CURRENT DENTAL APPLIANCE ON THE CURRENT DENTAL APPLIANCE ASSOCIATED WITH THE FIRST REPRESENTATION, WHERE THE FIRST REPRESENTATION IS THE CURRENT DIGITAL TEETH MODEL
1220

DETERMINE A SUPERIMPOSED PORTION OF THE FIRST REPRESENTATION BASED ON THE SUPERIMPOSING
1230

CREATE THE NEW DIGITAL TEETH MODEL BY REMOVING THE SUPERIMPOSED PORTION OF THE FIRST REPRESENTATION
1240

FIG. 12

METHOD AND A SYSTEM USABLE IN CREATING A SUBSEQUENT DENTAL APPLIANCE

CROSS-REFERENCE TO RELATED APPLICATIONS

This application is a continuation of U.S. application Ser. No. 16/200,445, filed Nov. 26, 2018, Now U.S. Pat. No. 11,432,907, which is a continuation of U.S. Application Ser. No. 13/605,949, filed Sep. 6, 2012, now abandoned, and which are incorporated herein by reference in their entirety and to which applications we claim priority under 35 USC § 120.

BACKGROUND

Frequently a patient will wear some type of dental appliance, such as a retainer, positioner, or splint, after their orthodontic braces have been removed in order to prevent the positions of the patient's teeth from deviating from the accomplished teeth arrangement. A set of braces is one example of what shall be referred to herein as a "current dental appliance." A dental appliance that is worn after removal of the current dental appliance shall be referred to herein as a "subsequent dental appliance." Retainers are an example of a subsequent dental appliance. Alternatively, patients in orthodontic braces may wish to discontinue wearing the bonded braces during treatment and finish the remainder of their treatment with additional dental appliances such as a clear removable plastic aligner. In the event that the treatment consists of a combination of braces followed by removable aligners, a transition between the braces and aligners without having to manufacture a temporary holding retainer (to minimize tooth movement after the braces are removed) between the two phases of treatment is desired.

To manufacture the subsequent dental appliance, physical impressions may be taken with the current dental appliance still affixed to the patient's teeth in order to minimize the amount of undesirable tooth movement which may occur between the time after the removal of the current dental appliance and the time that the subsequent dental appliance is delivered. By leaving the current dental appliance on for the impressions, it is hoped that the subsequent dental appliance can be manufactured while the teeth are held in place with the current dental appliance and delivered immediately after the current dental appliances are removed. However, the impressions that are taken with the current dental appliance affixed on the patient can be difficult—not only for the clinician, but also for the patient—because of the undercuts present in the current dental appliance which lock in the impression material as it sets. This is not only uncomfortable and messy for the patient, but can also lead to impression distortion if, for example, excessive force is required to free the locked impression from the teeth when the current dental appliances are still present. As a result of any distortion in the impression, the subsequent dental appliances may not fit well on the patient's teeth when they are delivered. Even after the impression is taken, a technician will have to spend considerable effort manually cleaning up any model made from the impression and manually removing all parts of the current appliance and any distortion and other defects arising from taking the impression. These are just a few examples of why physical impressions are undesirable.

More often, the treating professional waits until the current dental appliance is removed before taking an impression. This eliminates some of the difficulties in taking the impression with the current appliance but, results in a need for a temporary retainer or no retainer for the period in which it takes to make a subsequent dental appliance. The later risks teeth movement before the subsequent dental appliance can be applied to the teeth. In either case, it also necessitates another appointment with the treating professional to fit and apply the subsequent appliance.

BRIEF DESCRIPTION OF THE DRAWINGS

The accompanying drawings, which are incorporated in and form a part of this Description of Embodiments, illustrate various embodiments of the present invention and, together with the description, serve to explain the principles discussed below:

FIGS. 11-15 depict flowcharts of methods for creating a new digital dental model, according to various embodiments.

Figure 1A:
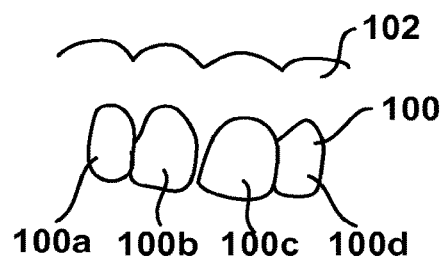
FIGS. 1a-1d, 1f, 1g illustrate a patient's set of physical teeth with respective physical teeth and gingiva and examples of dental appliances attached to the patient's set of physical teeth, according to various embodiments.

The drawings referred to in this Brief Description should not be understood as being drawn to scale unless specifically noted.

DESCRIPTION OF EMBODIMENTS

According to one embodiment, a current digital dental model, such as a digital image, is made of the patient's physical teeth with one or more current dental appliances attached to the physical teeth normally just before the current dental appliance is to be removed and replaced with a subsequent dental appliance. If the subsequent appliance is an end-of-treatment retainer, the teeth are usually at or near a desired arrangement of the teeth. If the subsequent appliance is a middle-of-treatment appliance, the teeth are at a treatment arrangement that is between the initial arrangement and the desired arrangement.

Various types of direct or indirect scanning or imaging (such as an intraoral scan, CBCT, or various types of scan of physical models or impressions including laser and computed tomography) can be used for creating the current digital dental model. According to a preferred embodiment, the current digital dental model is a direct digital scan of the set of physical teeth with the current dental appliance attached to one or more of the physical teeth. Various embodiments may also be used with a current dental appliance that is attached to the patient's oral cavity, such as to the patient's bone beneath the gingiva.

Examples of a current dental appliance include any dental appliance suitable for attachment to one or more of the patient's teeth and a dental appliance suitable for attachment to the patient's bone beneath the gingival, among others. More specifically, the current dental appliance may consist of one or more items and may be all or a portion of a set of braces (which may include bonded brackets, buttons, cemented bands, or a combination thereof), a temporary anchorage device (TAD) that is attached to the patient's oral cavity, or a dental attachment that is suitable for use with a removable plastic positioning dental appliance (also referred to herein as an "aligner"), a dental appliance suitable for attachment to bone under the gingiva of the patient, a sleep apnea appliance, a splint, a bridge, an implant, an orthodontic band, a fixed lingual retainer, a set of lingual braces or any item that has been fixedly attached to any portion of the oral cavity, as examples. Examples of types of TADs are a mini screw, a mini plate, a ball type, a bracket type and a hook type. The current dental appliance may be positioned on either the facial/buccal surface, the lingual surface of the patient's physical teeth, the gingiva, or a combination thereof.

A new digital dental model of the aligned teeth (either fully or partially) can be created based on a model of the current teeth with the current dental appliance present or from a previous model of the unaligned teeth without the current dental appliance present. For example, the new digital dental model may be created by removing the current dental appliance from the current digital dental model or by moving digital teeth of an earlier time point (of the same patient) without the dental appliance present into the same positions as the teeth in the current digital dental model (with the dental appliance present), among other things as described herein. According to one embodiment, the creation of the new digital dental model is computer automated. The creation of the new digital dental model can be fully automated or substantially-automated.

A new digital dental model can be used to manufacture a subsequent dental appliance prior to removing the current dental appliance from the patient's physical teeth. Examples of a subsequent dental appliance are a retainer, an (active) aligner, an expander, a splint or bite guard, or a positioner. The retainer may be a Hawley, an Essix-type, a bonded wire, any vacuum-formed type stent, a spring-retainer, a clear splint, or a combination thereof. At least one example of a splint is an orthognathic surgery splint, among others.

According to one embodiment, the current digital dental model and the new digital dental model includes a portion of the patient's gingiva. For example, the current digital dental model and the new digital dental model may include at least the portion of the patient's gingiva that would be covered over by or adjacent to a subsequent dental appliance.

According to one embodiment, the current digital dental model and a new digital dental model may include digital teeth that represent all of a patient's physical teeth clinically present (i.e. unerupted and/or impacted teeth not included) whether natural or prosthetic (e.g., dental crown or bridge pontic). For the sake of simplicity however, many of the figures depict a subset of the patient's physical teeth.

FIG. 1a illustrates a patient's set of physical teeth 100 with respective physical teeth 100a-100d and gingiva 102. FIGS. 1b-1d, 1f and 1g illustrate examples of dental appliances 112, 122, 132, 152, 162 attached to the patient's set of physical teeth 100, according to various embodiments. For the sake of simplicity, FIGS. 1a-g depicts a subset of the patient's physical teeth.

Example 110 depicts the patient's set of physical teeth 100 with a set of orthodontic braces 112 attached. The set of braces 112 may include one or more brackets, archwires, etc. Example 120 depicts the patient's set of physical teeth 100 with dental attachments 122 that are suitable for use with a removable plastic positioning dental appliance, such as an aligner. Example 130 depicts an orthodontic band attached to the patient's set of physical teeth 100. Example 140 depicts spaces 142, 146 on the side of the tooth and a space 144 at the back of the tooth after the removal of the orthodontic band 132 has been removed. Example 150 depicts a fixed lingual retainer 152. Example 160 depicts lingual braces.

The dental brackets and dental attachments as depicted in FIGS. 1b, 1c, 1d, 1f, 1g are considered some examples of and shall be referred to a "current dental appliance" since the dental appliances 112, 122, 132, 132, 152, 162 are currently attached to the patient's physical teeth 100. The dental attachments 122 may be aligner attachments for use with an aligner.

The patient's set of physical teeth 100 are at or close to a desired teeth arrangement, according to one embodiment. A desired teeth arrangement, according to one embodiment, is the final teeth arrangement that is accomplished as a result of orthodontic treatment. According to one embodiment, the patient's physical teeth 100 may be at the desired teeth arrangement as a result of an orthodontic treatment. According to another embodiment, the patient's physical teeth 100 are close to, but not exactly at the desired teeth arrangement. For example, due to the current dental appliance 112, a feature such as a cemented orthodontic band 132 (FIG. 1d) may take up a small space in between two physical teeth adjacent to each other. A space 142, 146 (FIG. 1e) between the adjacent physical teeth can also be referred to as an "interproximal space." When the bands are removed, the interproximal space that existed because of the bands will close. Various embodiments are also well-suited for physical teeth that are close to the desired teeth arrangement, but not exactly at the desired teeth arrangement. Another example is that a treating professional may want to start creating a subsequent appliance before the teeth have moved all the way to the desired tooth arrangement.

Although many embodiments are described in the context of a set of braces 112, the current dental appliance may be any type of dental appliance that can be attached to one or more of the patient's physical teeth 100 or to the patient's tissues within the oral cavity. The current dental appliance may be any type of dental appliance that is suitable for use with a removable plastic positioning dental appliance.

Figure 1B:
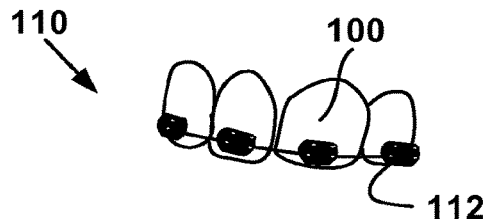
Figure 1C:
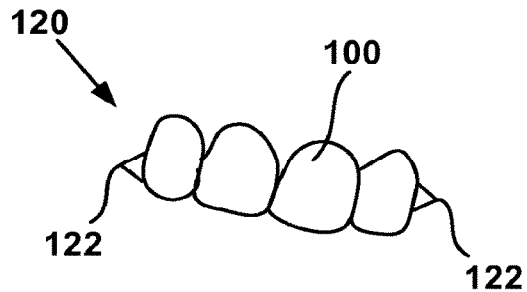
Figure 2A:
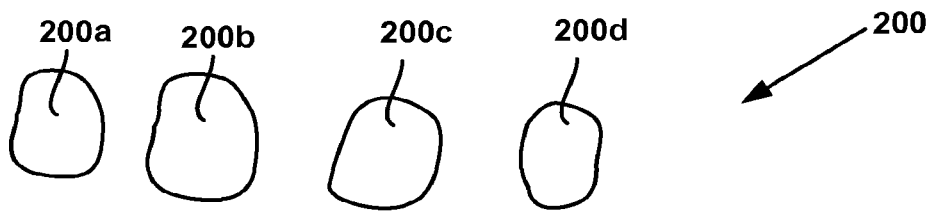
FIGS. 2a-6c illustrate techniques for creating a new digital dental model, according to various embodiments.
Figure 2B:
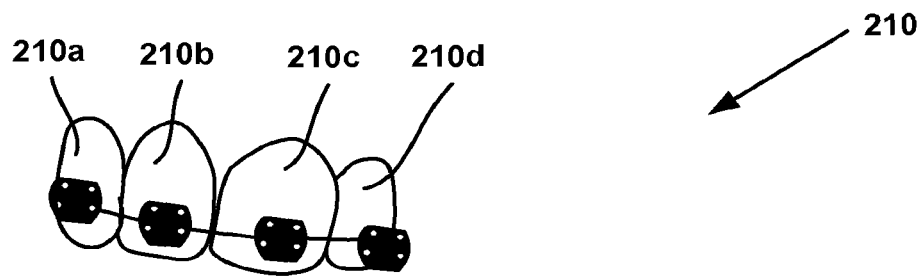
Figure 2C:
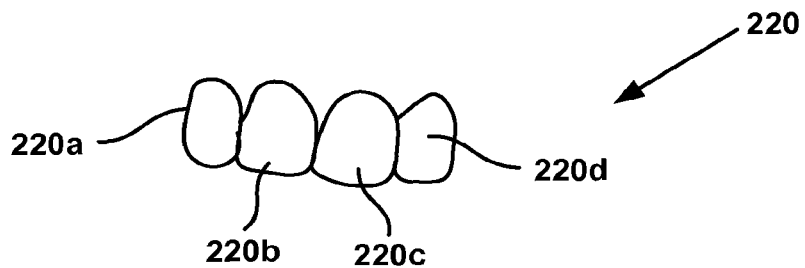

FIGS. 2a-c illustrate a technique for creating a new digital dental model, according to one embodiment. FIG. 2a depicts segmented digital teeth 200 of the patient, FIG. 2b depicts a current digital dental model 210, and FIG. 2c depicts a new digital dental model 220. The current digital dental model 210 is a representation of the patient's set of physical teeth 100 (FIG. 1a) and the dental appliance 112 (FIG. 1b) that is currently attached to the patient's physical teeth 100.

According to one embodiment, a digital scan of the patient's physical teeth 100 is taken without any dental appliance being on the patient's physical teeth 100. The digital scan can be processed to create segmented digital teeth 200 of the patient. Each 200a-200d of the segmented digital teeth 200 represents a different one 100a-100d (FIG. 1a) of the patient's physical teeth 100 (FIG. 1a). Each of the segmented digital teeth 200, according to one embodiment, has one or more axes of their own and three dimensional (3D) coordinates so that each of the segmented digital teeth can be freely positioned in 3D space. For example, 3D coordinates alone or 3D coordinates in combination with one or more axes can be used for positioning each of the segmented digital teeth 200 based on the positions of each individual digital tooth 210a-210d, 220a-220a associated with either the current digital dental model 210 or a new digital dental model 220, as will be described in more detail in the context of FIG. 16.

Each of the segmented digital teeth 200a-200d can be superimposed on the corresponding digital teeth 210a-210d associated with the current digital dental model 210. The surfaces shared in common (i.e. not covered by the dental appliance) can be used as references and the basis for the superimposition. A new location for the segmented digital teeth 200a-200d can then be assigned to each individual tooth, based on the position of the equivalent tooth in the new digital dental model 220 (the new digital dental model 220 can be segmented or unsegmented or partially segmented). The non-superimposed portion includes any portion of the current digital dental model 210 that is not part of the original digital dental model as represented by the segmented digital teeth 200. For example, the non-superimposed portion can include the current dental appliance 112 and any cement that is used for attaching the current dental appliance 112 to the patient's physical teeth 100 (FIG. 1b). The non-superimposed portion may also include changes to the gingival contours (due to inflammation for example). The new digital dental model 220 can be created either by removing the non superimposed portion of the current digital dental model 210 or by creating the new digital dental model 220 based on the superimposed portion without the non superimposed portion.

Figure 3A:
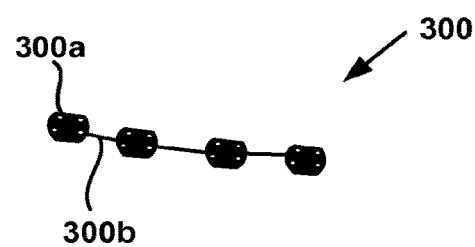
Figure 3B:
Figure 3C:
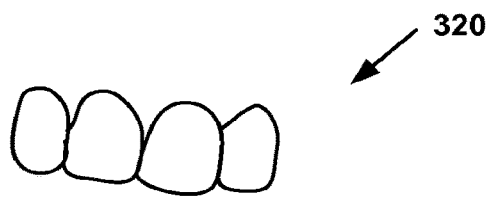

FIGS. 3a-3c illustrates a technique for creating a new digital dental model, according to one embodiment. FIG. 3a depicts a representation 300 of the current dental appliance, FIG. 3b the current digital dental model 210 (FIG. 2b), and FIG. 3c depicts a new digital dental model 320. The representation of the current dental appliance 300 may be an image that was taken of the same physical dental appliance. For example, a digital image of the dental appliance 112 (FIG. 1b) may have been taken when the dental appliance 112 was not applied to the patient's physical teeth 100 (FIG. 1a). The representation of the current dental appliance 300 or portion 300a, 300b may be an image obtained, for example, from a library of dental appliances of different types. The obtained image may be an image of a different physical dental appliance that is the same type or a similar type of as the current dental appliance 112 (FIG. 1b). For example, the obtained image may be an image of a different physical dental appliance that is the same make or model, or a combination thereof, as the current dental appliance 112 (FIG. 1b).

A representation of all 300 or a portion 300a, 300b of the current dental appliance 112 (FIG. 1b) may be superimposed. Examples of a portion 300a, 300b of the current dental appliance 112 (FIG. 1b) are a bracket, a wire, a band, a tube, a cleat, a button, a ligature wire, a hook, an aligner attachment, and an O-ring.

The representation of the current dental appliance 300 can be superimposed on the current digital dental model 210 (FIG. 2b). The portion of the current digital dental model 210 that is superimposed by the representation of the current dental appliance 300 or by the portion 300a, 300b can be determined. The new digital dental model 320 can be created, for example, by removing the superimposed portion from the current digital dental model 210 or by creating the new digital dental model 320 based on the non superimposed portion without the superimposed portion.

According to one embodiment, the new digital dental model 320 may include representations of excess cement or offsets to the surfaces of the physical teeth due to the cement, or a combination thereof. Therefore, a subsequent dental appliance that is created based on the new digital dental model 320 will fit the patient's physical teeth 100 (FIG. 1a) but may be slightly larger than a subsequent dental appliance created, for example, using a new digital dental model 220 (FIG. 2b). Various embodiments can be used to remove the representations of the excess cement. For example, at least various embodiments described in the context of FIGS. 5a-5c may be used to remove the representations of the excess cement.

Figure 4A:
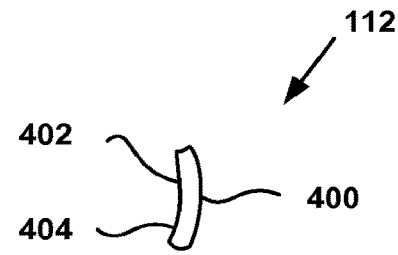
Figure 4B:
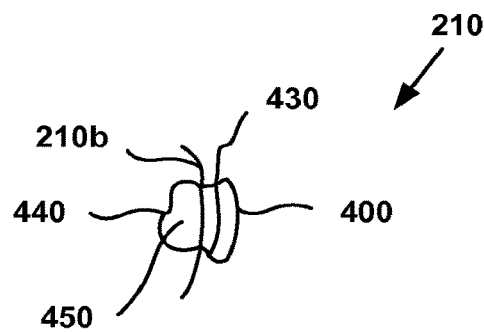
Figure 4C:
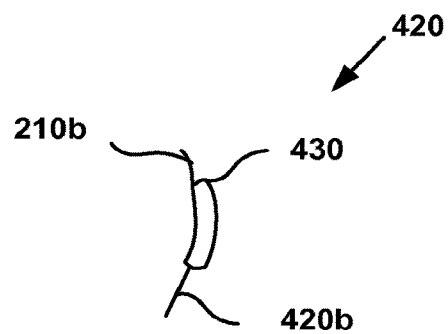

FIGS. 4a-4c illustrate a technique for creating a new digital dental model, according to one embodiment. FIG. 4a depicts a bracket base 400, a digital tooth 210b that is a part of a current digital dental model 210, and a representation 420b that is a part of a new digital dental model 420. The bracket base 400 is associated with a current dental appliance 112 (FIG. 1b) for the patient or is associated with a dental appliance that is a similar type or the same type as the current dental appliance 112 (FIG. 1b). The underneath surface 402 of the bracket base 400 has a contour 404 that approximates the contour 450 of the digital tooth 210b's portion 440.

As depicted in FIG. 4b, a bracket base 400 is attached to a portion 440 of a digital tooth 210b with cement 430. According to one embodiment, the contour 450 of the portion 440 of the digital tooth 210b associated with the current digital dental model 210 (FIG. 2b) is estimated based on the contour 404 of the underneath surface 402 of the bracket base 400.

Various embodiments are well-suited for approximating the contour 450 of a portion 440 a digital tooth portion 440 based on other portions, as discussed herein, of a dental appliance besides a bracket base, as discussed herein. For example, if a portion of a digital tooth is beneath a bonded lingual wire, various embodiments are well-suited for using a contour underneath the bonded lingual wire to estimate the contour of a portion of digital tooth that would be beneath that wire.

Referring to FIG. 4c, according to one embodiment, the new digital tooth 420b of the new digital dental model 420 may include representations of excess cement 430 or offsets to the surfaces of the physical teeth due to the cement 430, or a combination thereof. For example, cement 430 may appear to be part of the digital tooth 210b. Therefore, a subsequent dental appliance that would be created based on the new digital dental model 420 (FIG. 4c) would fit the patient's physical teeth 100 (FIG. 1a) but may be slightly larger than a subsequent dental appliance created, for example, using a new digital dental model 220 (FIG. 2b). Therefore, it is desirable to remove such representations of excess cement and or offsets. Various embodiments can be used to remove the representations of the excess cement 430. For example, at least various embodiments described in the context of FIGS. 5a-5c may be used to remove the representations of the excess cement 430.

Figure 5A:
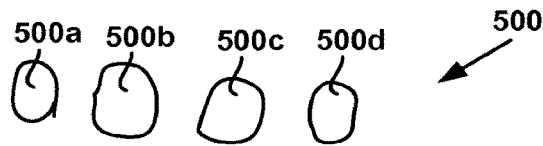
Figure 5B:
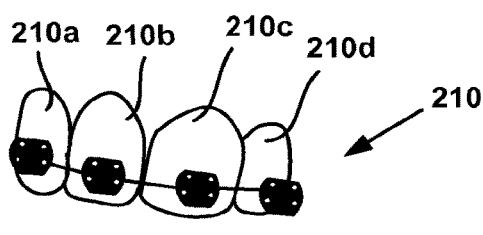
Figure 5C:

FIGS. 5a-5c illustrate a technique for creating a new digital dental model, according to one embodiment. FIG. 5a depicts digital teeth 500a-500d that are each similar to respective digital teeth 210a-210d (FIG. 2b) associated with a current digital dental model 210. A similar digital tooth 500a-500d may be obtained by averaging a plurality of digital teeth from a library of digital teeth, for example. A similar digital tooth 500a-500d may be an image of another physical tooth associated with the patient. For example, because of midplane symmetry of most individuals, a patient's two front teeth 100b, 100c (FIG. 1a) are approximate mirror images of each other. A digital image of one of a patient's front teeth 100b can be created based on a mirror image of a digital image of the patient's contralateral front tooth 100c. Physical teeth 100a and 100d (FIG. 1a) are also examples of teeth that may be similar to each other. For example, a mirror image of physical tooth 100a could be superimposed on digital tooth 210d or a mirror image of physical tooth 100d could be superimposed on digital tooth 210a. The similar digital teeth 500 may be images of physical teeth from another person besides the patient. For example, the other person may be selected based on similar demographics as the patient. Examples of demographics used in determining if digital teeth are similar to each other include sex, age, ethnicity, size of teeth, such as small, medium, or large, and shape of the teeth, such as bulbous or flat, square or tapered.

A similar digital tooth 500a-500d may be resized based on the size of a digital tooth 210a-210d (FIG. 2b) in the current digital dental model 210 (FIG. 2b). For example, the similar digital tooth 500a-500d may be resized to match or approximately match one of the digital teeth 210a-210d in the current digital dental model 210. According to one embodiment, the similar digital tooth 500a-500d is resized to be slightly larger than the digital tooth 210a-210d that it will superimpose to ensure that the subsequent dental appliance fits the patient's physical teeth 100 (FIG. 1a).

A similar digital tooth 500a-500d, according to one embodiment, has its own three-dimensional (3D) coordinates, as discussed herein, so that a similar digital tooth 500a-500d can be positioned, for example, based on the position of a corresponding digital tooth 210a-210d (FIG. 2b) associated with either the current digital dental model 210 or the new digital dental model 520.

Each of the similar digital teeth 500a-500d can be superimposed on corresponding digital teeth 210a-210d (FIG. 2b) associated with the current digital dental model 210. The 3D coordinates associated with each of the similar digital teeth 500a-500d can be reset as a part of the superimposing. The non superimposed portion can then be determined. For example, the non-superimposed portion includes the current dental appliance 112 (FIG. 1b). The new digital dental model 520 can be created by removing the non-superimposed portion of the current digital dental model 210 (FIG. 2b) or by creating the new digital dental model 520 based on the superimposed portion without the non superimposed portion.

Figure 6A:
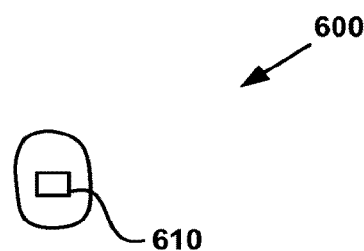
Figure 6B:
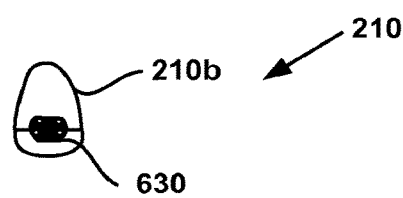
Figure 6C:
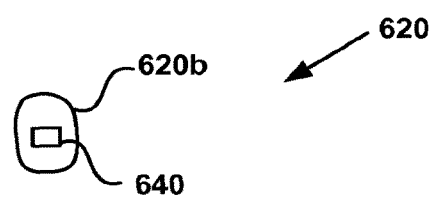

FIGS. 6a-c illustrate a technique for creating a new digital dental model, according to one embodiment. An area or a subset 630 of a digital tooth 210b (FIG. 2b) in the current digital dental model 210 (FIG. 2b) may be beneath a portion of the current dental appliance 112 (FIG. 1b). Examples of a portion of the current dental appliance are a bracket, a wire, a tube, a cleat, a button, a ligature wire, a hook, a band, an aligner attachment, and an O-ring. According to one embodiment, a corresponding area or subset 610 of a similar digital tooth 600, as described herein, can be used to estimate a contour of the hidden area or subset 630 of a digital tooth 210b in the current digital dental model 210. The estimation can be used for creating a contour in a corresponding area of the subset 640 for a digital tooth 620b of the new digital dental model 620.

According to one embodiment, the physical teeth 100 (FIG. 1a) may be close but not at the desired teeth arrangement when the current digital dental model 210 (FIGS. 2a-6c) is created. For example, the current dental appliance may have a feature, such as an orthodontic band 132 (FIG. 1d) that prevents complete closure of an interproximal space between adjacent physical teeth. In another example, the patient may be unavailable when their teeth 100 (FIG. 1a) are at the desired teeth arrangement, for example, due to travel plans. The current digital dental model 210 (FIG. 2b) may be created before the patient leaves on their trip so that a subsequent dental appliance, such as a retainer, will be available upon their return, at which time, the one or more of the current appliances would be removed.

Therefore, according to one embodiment, to create a current digital dental model 210 (FIGS. 2b-6b) when the patient's physical teeth 100 (FIG. 1a) are close but not at the desired teeth arrangement, positions of one or more digital teeth in the new digital dental model 220-620 (FIGS. 2c-6c) may be adjusted to the desired teeth arrangement. Information pertaining to one or more dimensions of the feature or descriptions of the feature can be used to determine how to adjust the positions of the one or more digital teeth in the new digital dental model 220-620 (FIGS. 2c-6c). For example, in the case of an orthodontic band 132 (FIG. 1d), the width of the orthodontic band (either as a known dimension or a measurement derived from the scan) can be used to adjust the positions of the digital teeth to reflect that the interproximal space which had been maintained physically by the band will lessen when the band is removed. A subsequent dental appliance that is manufactured based on a new digital dental model 220-620 (FIGS. 2c-6c) adjusted to the desired teeth arrangement can be used to move the physical teeth to the desired teeth arrangement. An individual digital tooth's 3D coordinates can be adjusted as a part of adjusting positions, as discussed herein, meaning, for example, that the individually segmented digital teeth may be digitally repositioned within the arch.

Figure 7:
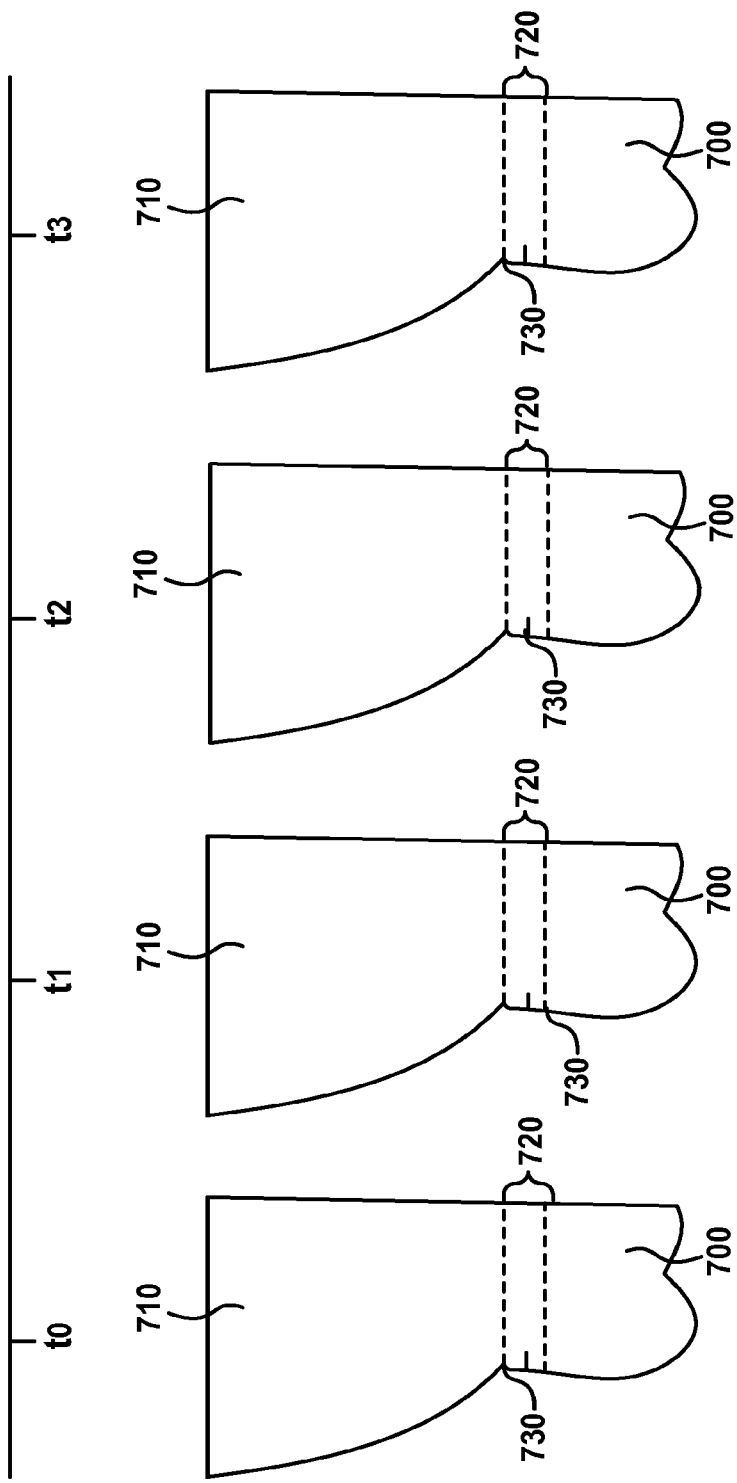
FIG. 7 illustrates changes to a patient's gingiva, according to one embodiment.

FIG. 7 illustrates changes in a patient's gingiva, according to one embodiment. FIG. 7 depicts one of the patient's teeth 700 and corresponding gingiva 710. Frequently after a current dental appliance, such as a set of braces, the patient's gingiva 710 can be swollen or inflamed. With time and appropriate hygiene, the puffiness of the patient's gingiva 710 tends to reduce, causing the gingival contours to decrease. For example, as depicted in FIG. 7, the patient's gingiva 710 is at the baseline at t0 (pre-treatment), becomes inflamed and is the most enlarged at time t1, and then less enlarged at time t2 as the inflammation reduces, and is near or back to normal at time t3.

According to one embodiment, a new digital dental model 220-620 (FIGS. 2c-6c) includes the portion of the patient's gingiva that is in proximity of the subsequent dental appliance or that would be covered by a subsequent dental appliance, or a combination thereof. According to one embodiment, a series of new digital dental models can be created, for example, that takes into account the changes in the patient's gingival contour 730. For example, a new digital dental model may be created that accommodates the patient's gingiva 710 at time t1, a second new digital dental model may be created that accommodates the patient's gingiva 710 at time t2, and a third new digital dental model may be created that accommodates the patient's gingiva 710 at time t3. Further, as depicted in FIG. 7, the gingival contour 730 increases as indicated by 720, for example, from time t0 to t1. Various embodiments are also well-suited for swollen gingiva 710 due to a portion of a current dental appliance 112 (FIG. 1*b*) being placed near the patient's gingiva.

According to one embodiment, one or more changes in the patient's gingiva is simulated, as will be described in more detail in the context of FIGS. 17-19. According to another embodiment, the patient's gingival contour prior to treatment is used to estimate one or more changes in the patient's gingiva. For example, a digital dental model taken at time t0 (FIG. 7) of the patient's teeth and gingiva that was created prior to changes in the patient's gingiva or prior to application of a dental appliance may be used. Any type of imaging or scanning as discussed herein may be used for obtaining the digital dental model. Further, the current digital dental model may include a representation of the patient's gingiva contour when the patient's physical teeth are at a treatment position or at or close to the desired teeth arrangement. The prior digital dental model and the current digital dental model can be used to estimate the changes in the patient's gingival contour over time. For example, a linear or an exponential curve, among others, could be used to estimate the patient's expected gingival changes. According to one embodiment, the patient's gingival contour is modeled so that the subsequent dental appliance adapts well and does not leave any exposed edges that might irritate the tongue or surrounding soft tissue while at the same time providing an appliance that is not too tight, which might irritate the tissue underneath from the pressure exerted by the appliance. According to one embodiment, the patient's gingiva is selectively modeled. For example, assuming for the sake of illustration that a first portion of the patient's gingival at time t3 is swollen and a second portion of the patient's gingiva at time t3 has experienced recession or shrinkage. In this case, a first gingival modeling technique can be used on the first portion of the patient's gingiva and a second gingival modeling technique can be used on the second portion of the patient's gingiva. For example, the changes that will occur in the patient's gingiva after removal of the current dental appliance can be tracked using simulation or non-simulation embodiments on the first portion while the patient's pre-treatment gingival contour taken at time t0 can be used for the second portion without or with minimal use of simulation or non-simulation embodiments.

Figure 8A:
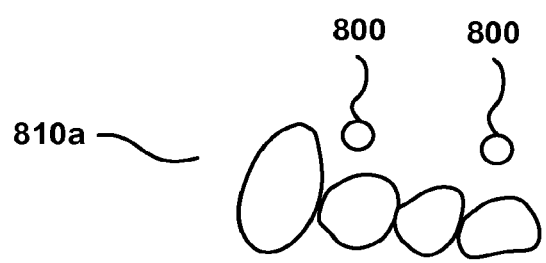
FIGS. 8a and 8b depict examples of temporary anchorage devices (TADs) 800 attached inside the patient's oral cavity, according to various embodiments.
Figure 8B:
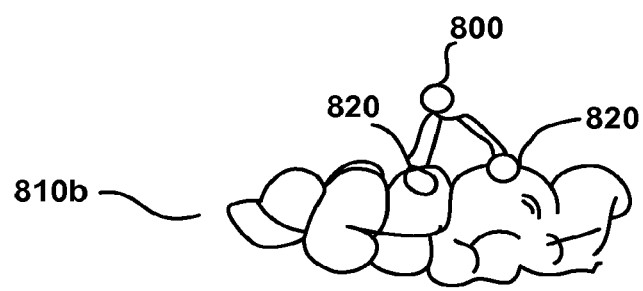

FIGS. 8*a* and 8*b* depict examples of temporary anchorage devices (TAD) 800 attached to the patient's oral cavity, according to various embodiments. FIG. 8*a* depicts TADs 800 located on the labial (or facial) side of the oral cavity 810*a* and FIG. 8*b* depicts a TAD with buttons 820 bonded to teeth located on the lingual side of the oral cavity 810*b*. A temporary anchorage device 800 is an example of a current dental appliance that could be a part of a current digital dental model 210 (FIGS. 2*b*-6*b*) and that various embodiments are well-suited for creating a new digital dental model that excludes the temporary anchorage device 800. Examples of portions of the oral cavity 810 that may be a part of a current digital dental model and a new digital dental model for the purposes of various embodiments is any portion of the oral cavity 810 that a subsequent dental appliance, such as a retainer, may overlap. The alveolar bone under the gingiva is an example of a portion of the patient's oral cavity 810. Other examples of anchorage devices are a bonescrew and a plate. A TAD 800 may have a ball, a bracket or a hook, among other things, on the end that is exposed to the oral cavity for the purpose of attaching, for example, a wire, elastic, or a ligature, among other things.

Various embodiments are also well-suited for changes in the gingiva that result from a TAD or other types of devices that cause changes to the gingiva. For example, a portion of a TAD will typically be embedded in the gingiva into the bone beneath, which can cause a portion of the gingiva to swell. Various embodiments, such as a simulation, not requiring a simulation, and using the patient's original gingiva contour (depicted at time t0 in FIG. 7), as described herein, are well-suited for calculating, estimating, determining the changes in the patient's gingiva due to a dental appliance that is attached to the oral cavity.

As discussed herein, for the sake of simplicity, many embodiments were described in the context of a current digital dental model 210 that is a representation that included a set of braces. However, as discussed herein, embodiments are well suited for removing a current dental appliance 122 (FIG. 1*b*) that is suited-for use with a removable plastic positioning dental appliance, such as an aligner. For example, various embodiments are well suited for a current digital dental model that includes a representation of the set of physical teeth 100 (FIG. 1*a*) for the patient with the current dental appliance 122 attached to the physical teeth 100. According to one embodiment, the geometry of the current dental appliance 122 in combination with the geometry of the physical teeth 100, for example as represented by segmented digital teeth 200, can be superimposed on a current digital dental model to determine portions to be kept or removed as a part of creating a new digital dental model using various embodiments discussed herein. Further, embodiments are well suited for using different embodiments for different teeth. For example, if a physical tooth, which does not have a current dental appliance 122 attached, has been altered due to esthetics or removal of heavy contacts for occlusion adjustment, among other things, a digital tooth from the current digital dental model that corresponds to that physical tooth can be superimposed back onto itself. In another example, if a physical tooth has a current dental appliance 122 attached to it, a digital image of that physical tooth taken prior to application of the current dental appliance 122 can be superimposed.

According to one embodiment, the creation of a new digital dental model 220-620 (FIGS. 2*c*-6*c*) is computer automated. For example, one or more computer processors may be used for creating the new digital dental model 220-620 (FIGS. 2*c*-6*c*). According to one embodiment, the creation is entirely automatic without human intervention or without requiring human intervention. According to another embodiment, the creation is substantially automatic with some human intervention for clean up and double checking. According to one embodiment, the system is not merely a computer graphics system that a human uses to manually remove digital portions using a digital eraser or to copy digital portions of the current digital dental model 210 (FIGS. 2*b*-6*b*) as a part of creating the new digital dental model 220-620 (FIGS. 2*c*-6*c*). The phrase "computer automated" shall be used to refer to entirely automatic or substantially automatic. One example of substantially automatic is where a user can select a point, such as any voxel or 3D triangle, of a depicted orthodontic bracket of a current digital dental model 210 (FIGS. 2*b*-6*b*) and the system can detect the remaining portions connected to the selected region which can include, for example, the bracket or the bracket and the cement. In this case, the user may only identify and select one point for up to 32 digital teeth on a current digital dental model 210 (FIGS. 2b-6b).

According to various embodiments, a current digital dental model 210 (FIGS. 2b-6b) and the new digital dental models 220-620 (FIGS. 2c-6c) are three dimensional models. According to various embodiments, a new digital dental model 220-620 (FIGS. 2c-6c) can be used to manufacture a subsequent dental appliance prior to removing the current dental appliance 112, 122, 132, 152, 162, 800, 820 (FIGS. 1b, 1c, 1d, 1f, 1g, 8a, 8b) from the patient's physical teeth 100 (FIG. 1a). For example, the new digital dental model 220-620 (FIGS. 2c-6c) may be used to manufacture a subsequent dental appliance, such as a retainer, a splint or a positioner, among others, as discussed herein. A new digital dental model 220-620 (FIGS. 2c-6c) can be segmented or unsegmented or partially segmented, among other things.

According to one embodiment, a new digital dental model 220-620 (FIGS. 2c-6c) does not include or does not require the inclusion of any digital roots corresponding to any of the patient's physical teeth 100a-100d (FIG. 1a). According to one embodiment, a new digital dental model 220-620 (FIGS. 2c-6c) does not include or does not require the inclusion of any digital crowns. According to one embodiment, the current teeth arrangement of the digital teeth 210a-210d (FIG. 2b) of the current digital dental model 210 (FIGS. 2b-6b) is a current planned teeth arrangement that did not occur out of error or out of deviations but occurred due to the planned treatment. Therefore, according to various embodiments, neither a current digital dental model 210 (FIGS. 2b-6b) nor a new digital dental model 220-620 (FIGS. 2c-6c) is used or is required to be used as a part of causing the patient's physical teeth 100a-100d (FIG. 1a) to be positioned at a teeth arrangement that preceded the current planned teeth arrangement associated with the current digital dental model 210 (FIGS. 2b-6b).

Figure 9:
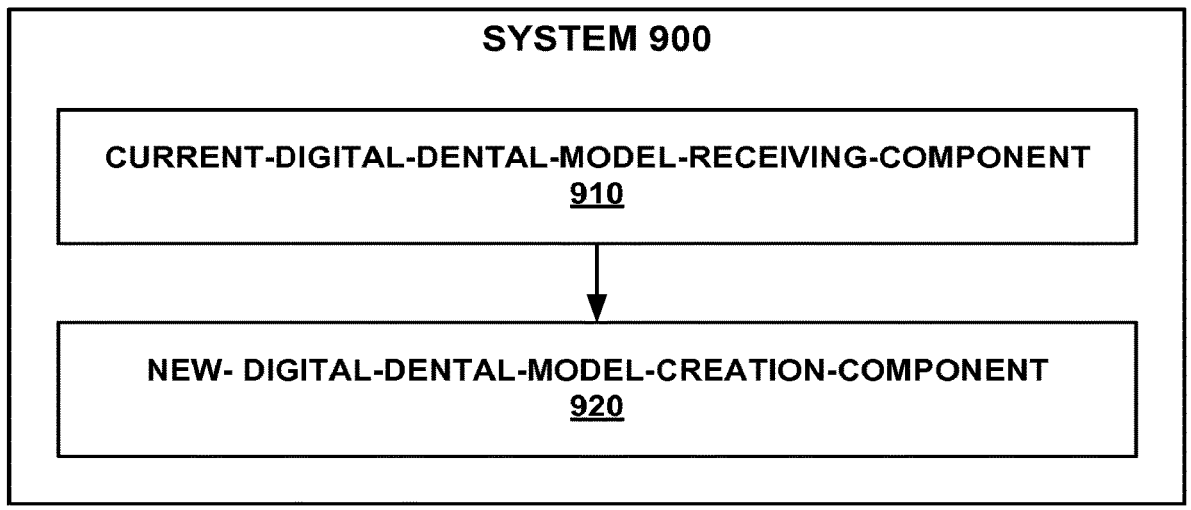
FIG. 9 is a block diagram of a system for creating a subsequent dental appliance prior to removal of a current dental appliance from a set of physical teeth for a patient, according to one embodiment.

FIG. 9 is a block diagram of a system for creating a subsequent dental appliance prior to removal of a current dental appliance from a set of physical teeth for a patient, according to one embodiment. The blocks that represent features in FIG. 9 can be arranged differently than as illustrated and can implement additional or fewer features than what are described herein. Further, the features represented by the blocks in FIG. 9 can be combined in various ways. The system 900 can be implemented using hardware, hardware and software, hardware and firmware, or a combination thereof.

The system 900 includes a current-digital-dental-model-receiving-component 910 and a new-digital-dental-model-creation-component 920. The new-digital-dental-model can either be segmented, partially segmented or unsegmented. The current-digital-dental-model-receiving-component 910 is suitable for receiving a current digital dental model 210 (FIGS. 2b-6b) that includes a representation of the set of physical teeth 100 (FIG. 1a) for the patient with the current dental appliance 112, 122, 132, 152, 162, 800, 820 (FIGS. 1b, 1c, 1d, 1f, 1g, 8a, 8b) attached to the physical teeth 100 or oral cavity 810a, 810b (FIGS. 8a, 8b) where the physical teeth 100 (FIG. 1a) are at a position in treatment when all or a part of the current dental appliance 112, 122, 132, 152, 162, 800, 820 is desired to be removed from one or more of the set of physical teeth 100 and it is desired to use a subsequent appliance. Alternatively, the received current digital dental model 210 includes the representation of the set of physical teeth 100 for the patient with the current dental appliance 112, 122, 132, 152, 162, 800, 820 attached to the physical teeth 100 that are at or close to a desired teeth arrangement. According to one embodiment, the received current digital dental model 210 (FIG. 2b-6b) is a direct digital scan of the set of physical teeth 100 and the current dental appliance 112, 122, 132, 152, 162, 800, 820.

The new-digital-dental-model-creation-component 920 is suitable for computer automated creation of a new digital dental model 220-620 (FIGS. 2c-6c) that includes the representation of the set of physical teeth 100 without including the current dental appliance 112, 122, 132, 152, 162, 800, 820 (FIGS. 1b, 1c, 1d, 1f, 1g, 8a, 8b) where the new digital dental model 220-620 (FIGS. 2c-6c) includes electronic data suitable for manufacturing of the subsequent dental appliance prior to removal of the current dental appliance 112, 122, 132, 152, 162, 800 from the set of physical teeth 100 (FIG. 1a) or the oral cavity 810a, 810b (FIGS. 8a, 8b).

The new-digital-dental-model-creation-component 920 may be further suitable for superimposing a segmented digital tooth 200a-200d (FIG. 2a) of the patient on corresponding individual digital tooth 210a-210d (FIG. 2b) associated with the current digital dental model 210 (FIG. 2b) where the segmented digital tooth 200a-200d was obtained from a digital dental model taken of the set of physical teeth 100 of the patient without the current dental appliance 112, 122, 132, 152, 162, 800, 820 (FIGS. 1b, 1c, 1d, 1f, 1g, 8a, 8b) attached. The new-digital-dental-model-creation-component 920 may be further suitable for superimposing a second representation of all 300 (FIG. 3a) or a portion 300a, 300b (FIG. 3a) of the current dental appliance 112, 122, 132, 152, 162, 800, 820 (FIGS. 1b, 1c, 1d, 1f, 1g, 8a, 8b) on the current dental appliance 122 (FIG. 1b) associated with the first representation 210, wherein the second representation 300, 300a, 300b (FIG. 3a) of the current dental appliance is obtained from a source selected from a group consisting of a library of dental appliances and an image of the current dental appliance when not applied to the set of physical teeth. The new-digital-dental-model-creation-component 920 may be further suitable for estimating a contour 450 of a subset 440 of a digital tooth 210b included in the current digital dental model 210 (FIGS. 2b-6b) where the estimating is based on a contour 404 of the underneath surface 402 of a bracket base 400. The new-digital-dental-model-creation-component 920 may be further suitable for creating a similar digital tooth 600 based on an average of a plurality of physical teeth and determining a contour of a portion 630 of the digital tooth 210b of the current digital dental model 210 (FIGS. 2b-6b) based on a corresponding portion 610 the similar digital tooth 600.

According to one embodiment, the new digital dental model 220-620 (FIGS. 2c-6c) is an intermediate digital dental model and the new-digital-dental-model-creation-component 920 is further suitable for creating one of a series of intermediate digital dental models (also referred to herein as "a series of new digital dental models"). The series of intermediate digital dental models may approximate a series of changes in gingival contour 730 (FIG. 7) of the patient, as discussed herein. The changes in the gingival contour 730 of the patient can be determined or estimated based on a simulation, as discussed herein. The changes in the gingival contour 730 of the patient can be determined or estimated based on an original gingival contour of the patient without requiring simulation, as discussed herein. The changes in the gingival contour 730 of the patient may be due to the gingival contour changing at various points in time t0 to t3 (FIG. 7).

According to one embodiment, the new digital dental model 220-620 (FIGS. 2c-6c) is an intermediate digital dental model and the new-digital-dental-model-creation-component 920 is further suitable for creating one of a series of intermediate digital dental models (also referred to herein as "a series of new digital dental models"), as discussed herein.

Figure 10:
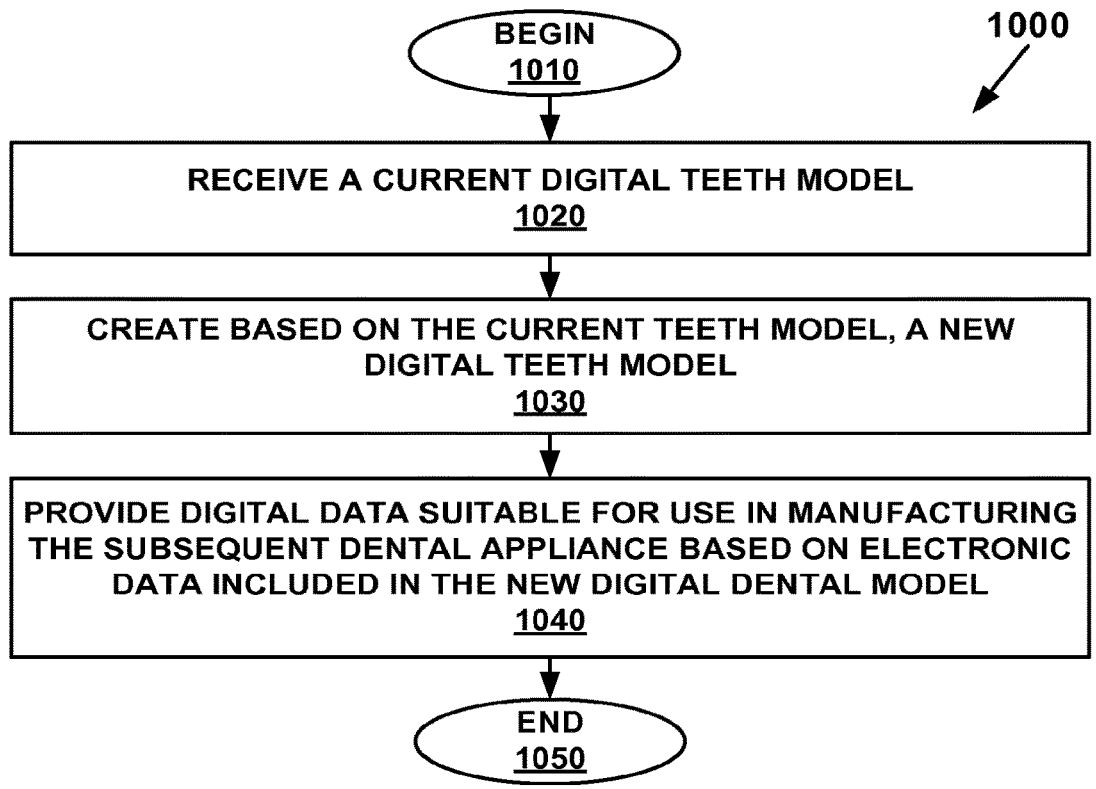
FIG. 10 depicts a flow chart of a method of creating a subsequent dental appliance prior to removal of a current dental appliance from a set of physical teeth for a patient, according to one embodiment.
Figure 13:
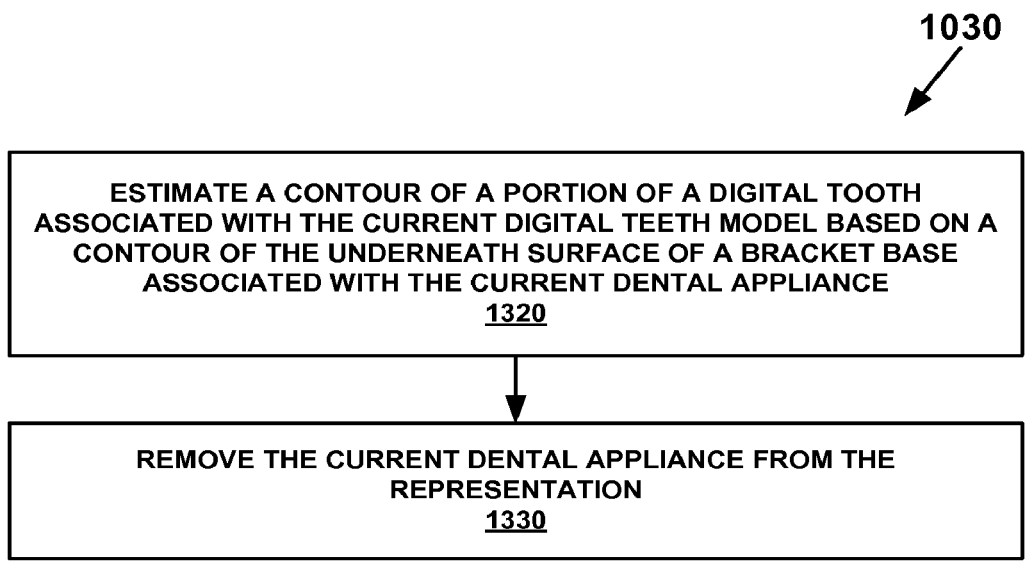
Figure 14:
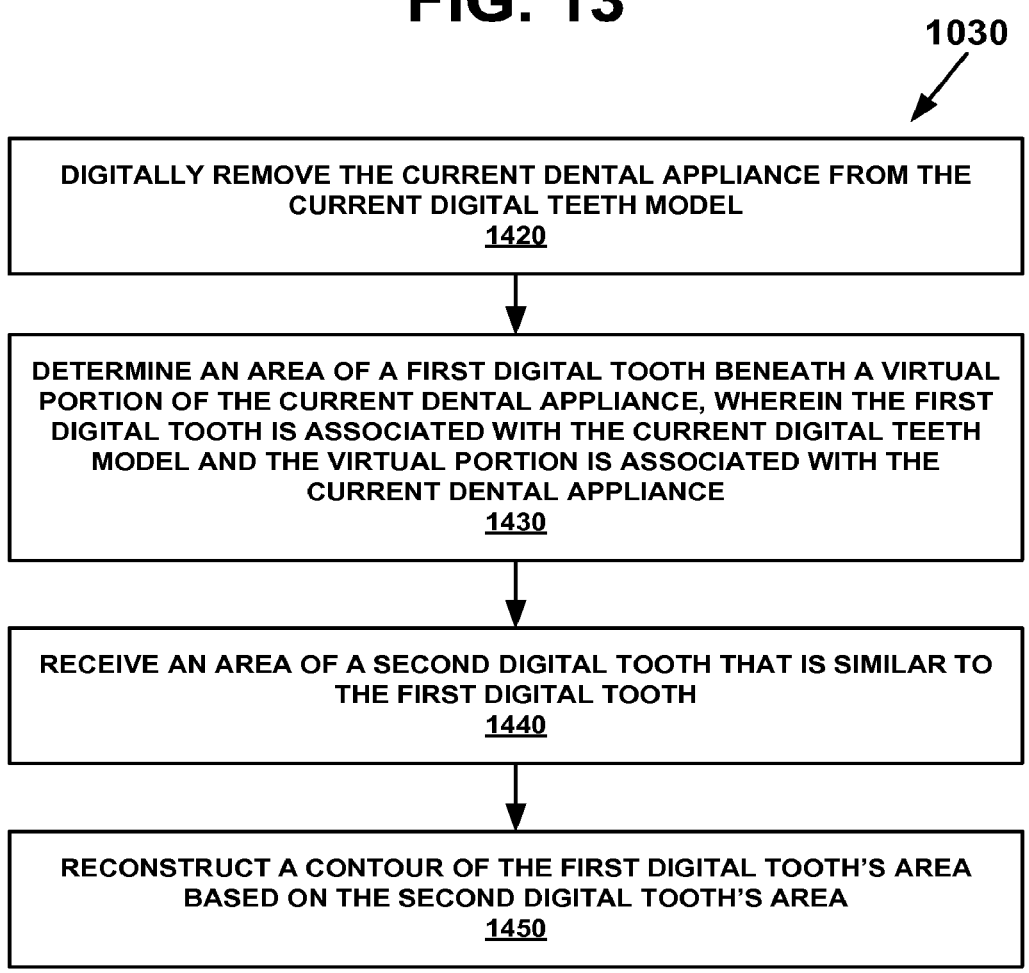
Figure 15:
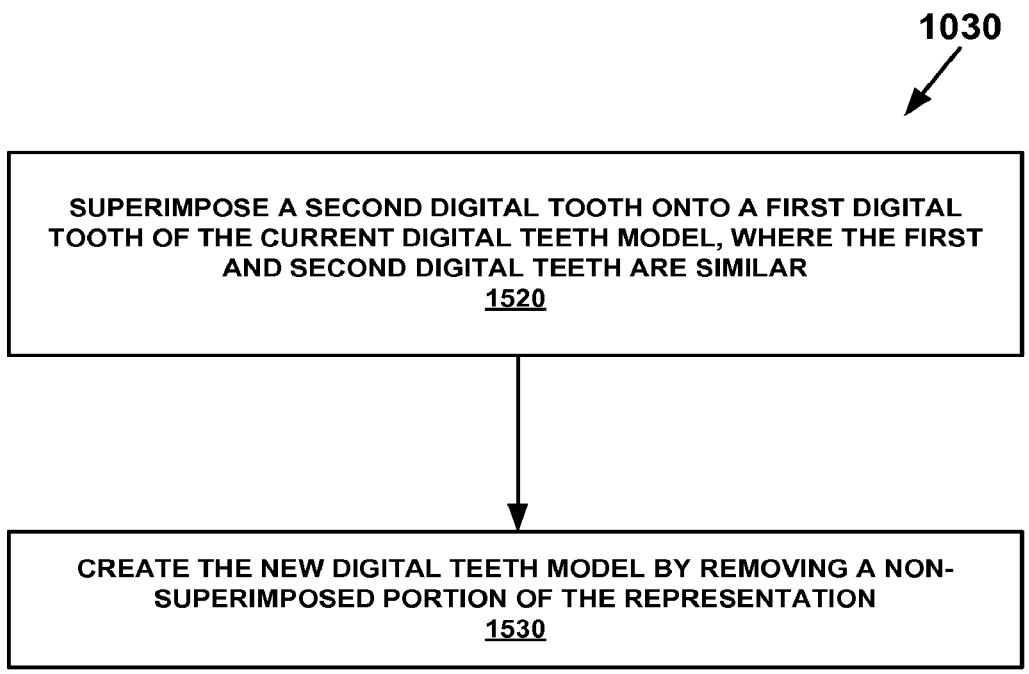

FIG. 10 depicts a flow chart 1000 of a method of creating a subsequent dental appliance prior to removal of a current dental appliance from a set of physical teeth for a patient, according to one embodiment. A current dental appliance 112, 122, 132, 152, 162, 800, 820 (FIGS. 1b, 1c, 1d, 1f, 1g, 8a, 8b) is attached to a patient's set of physical teeth 100 (FIG. 1a) or oral cavity 810a, 810b (FIGS. 8a, 8b). A current digital dental model 210 (FIG. 2b) can be created using various types of scanning or imaging. For example, an intraoral scan of the patient's physical teeth 100 (FIG. 1a) or of the patient's physical teeth 100 and oral cavity 810a, 810b (FIGS. 8a, 8b) with the current dental appliance 112, 122, 132, 152, 162 (FIG. 1b, 1c, 1d, 1f, 1g) attached can be used to create a current digital dental model 210 (FIGS. 2b-6b). According to one embodiment, the current digital dental model is a direct digital scan of the set of physical teeth and the current dental appliance At 1010, the method begins. At 1020, a current digital dental model 210 (FIGS. 1b-6b) is received that includes a representation of the set of physical teeth 100 (FIG. 1a) for the patient with the current dental appliance 112, 122, 132, 152, 162, 800, 820 (FIGS. 1b, 1c, 1d, 1f, 1g, 8a, 8b) attached to the physical teeth 100 (FIG. 1a) or oral cavity 810a, 810b (FIGS. 8a, 8b), where the physical teeth 100 are at a position in treatment when all or a part of the current dental appliance 112, 122, 132, 152, 162, 800, 820 is desired to be removed from one or more of the set of physical teeth 100 and it is desired to use a subsequent appliance. According to another embodiment, the received current digital dental model 210 includes the representation of the set of physical teeth 100 for the patient with the current dental appliance 112, 122, 132, 152, 162, 800, 820 attached to the physical teeth 100 that are at or close to a desired teeth arrangement.

The current dental appliance may be any dental appliance that can be attached to one or more of the patient's physical teeth 100 (FIG. 1a) or to the patient's oral cavity 810, 810b (FIGS. 8a, 8b).

At 1030, a new digital dental model 220-620 (FIGS. 2c-6c) that includes the representation of the set of physical teeth 100 (FIG. 1a) without including the current dental appliance 112, 122, 132, 152, 162, 800, 820 (FIGS. 1b, 1c, 1d, 1f, 1g, 8a, 8b) is created based on the current digital dental model 210 (FIG. 2b). Various embodiments can be used for creating a new digital dental model 220-620 (FIGS. 2c-6c), which shall be described in the context of FIGS. 11-15, among others.

Referring to FIGS. 2a-2c and 11, at 1120 each 200a-200d of segmented digital teeth 200 of the patient is superimposed on corresponding digital teeth 210a-210d associated with the current digital dental model 210. The segmented digital teeth 200a-200d are derived from the set of physical teeth 100 without any dental appliance 112, 122, 132, 152, 162, 800, 820 (FIGS. 1b, 1c, 1d, 1f, 1g, 8a, 8b) applied to the set of physical teeth 100. At 1130, a non-superimposed portion of the current digital dental model 210 is determined based on the superimposing 1120. At 1140, the new digital dental model 220 is created by removing the non-superimposed portion of the current digital dental model 210 that was determined at 1130.

Referring to FIGS. 3a-3c and 12, at 1220 a second representation 300, 300a, 300b of all or a portion of the current dental appliance is superimposed on the current dental appliance 112, 122, 132, 152, 162, 800, 820 (FIGS. 1b, 1c, 1d, 1f, 1g, 8a, 8b) associated with the first representation 210, where the first representation 210 is the current digital dental model 210. At 1230, a superimposed portion of the first representation 210 (FIG. 3b) is determined based on the superimposing at 1220. The new digital dental model 320 (FIG. 3c) is created at 1240 by removing the superimposed portion, associated with 300, 300a, 300b (FIG. 3a), of the first representation 210 that was determined at 1230.

Referring to FIGS. 4a-4c and 13, at 1320, a contour 450 of a portion 440 of a digital tooth 210b associated with the current digital dental model 210 is estimated based on a contour 404 of the underneath surface 402 of a bracket base 400 associated with the current dental appliance 112. At 1330, the current dental appliance 112 is removed from the representation 210, for example, as described in the context of FIGS. 3a-c and 12.

Referring to FIGS. 5a-5c and 14, at 1420 a second digital tooth 500b is superimposed onto a first digital tooth 210b of the current digital dental model 210, wherein the first digital tooth 210b and the second digital tooth 500b are similar. In a first example, the second digital tooth 500b that is superimposed on the first digital tooth 210b can be an average of a plurality of digital teeth that are not derived from the physical teeth 100 of the patient. In a second example, the first and second digital teeth 210b, 500b may represent different physical teeth of the patient. In a third example, the second digital tooth 500b may represent a physical tooth of a person that is not the patient. The size of the second digital tooth 500b may be scaled based on the size of the first digital tooth 210b that it is suited to superimpose. For example, the second digital tooth 500b may be sized to match or slightly exceed the first digital tooth 210b's size. At 1430, the new digital dental model 520 is created by removing a non superimposed portion of the representation.

Referring to FIGS. 6a-6c and 15, at 1520, the current dental appliance 112, 122, 132, 152, 162, 800, 820 (FIGS. 1b, 1c, 1d, 1f, 1g, 8a, 8b) is digitally removed from the representation 210. At 1530, an area 630 of a first digital tooth 210b beneath a virtual portion of the current dental appliance 112, 122, 132, 152, 162, 800, 820 (FIGS. 1b, 1c, 1d, 1f, 1g, 8a, 8b) is determined, where the first digital tooth 210b is associated with the current digital dental model 210 and the virtual portion is associated with the current dental appliance 1112, 122, 132, 152, 162, 800, 820 (FIGS. 1b, 1c, 1d, 1f, 1g, 8a, 8b). Examples of the virtual portion are a bracket, a wire, button, a cleat, a tube, a hook, a band, a ligature wire, an aligner attachment and an O-ring.

The following is an example of combining various embodiments to create a new digital dental model. The current dental appliance 300 can be removed from the representation 210, as illustrated FIGS. 3a-3c, for example. An area 440 of a first digital tooth 210b beneath a virtual portion 400 of the current dental appliance 112, 122, 132, 152, 162, 800, 820 (FIGS. 1b, 1c, 1d, 1f, 1g, 8a, 8b) can be determined, where the first digital tooth 210b is associated with the current digital dental model 210 and the virtual portion 400 is associated with the current dental appliance 112, 122, 132, 152, 162, 800, 820 (FIGS. 1b, 1c, 1d, 1f, 1g, 8a, 8b), as described illustrated in FIGS. 4a-4c, for example. An area 610 of a second digital tooth 600 that is similar to the first digital tooth 210b is received and a contour of the first digital tooth's area 630 is reconstructed based on the second digital tooth 600's area 610, as illustrated in FIGS. 6a-6c, for example.

The following is another example of combining various embodiments to create a new digital dental model. A segmented digital tooth 200a-200d of the patient can be superimposed on a first digital tooth 210a associated with the current digital dental model 210 as illustrated in FIGS. 2a-2c. A second representation 300, 300a, 300b of all or a portion of the current dental appliance can be superimposed on the current dental appliance associated with the current digital dental model 210 as discussed in the context of FIGS. 3a-3c. A contour of a portion of a second digital tooth 210b of the current digital dental model 210 can be estimated based on a contour 404 of the underneath surface 402 of a portion 400 of the current dental appliance 112, 122, 132, 152, 162, 800, 820 (FIGS. 1b, 1c, 1d, 1f, 1g, 8a, 8b) as illustrated in FIG. 4b. All or a portion 610 of a similar digital tooth 500c, 600 can be superimposed on a third digital tooth 210c of the current digital dental model 210 as discussed in the context of FIGS. 5a, 5b and 6a. According to one embodiment, the first digital tooth 210a, the second digital tooth 210b and the third digital tooth 210c correspond to different ones of the patient's physical teeth 100a-100c.

Various embodiments for creating a new digital dental model 220-620 (FIGS. 2c-6c) are also well-suited for including the gingiva 710 (FIG. 7) in a new digital dental model 220-620 (FIGS. 2c-6c) or changes to the gingiva 710, as indicated by 720 (FIG. 7), in a series of new digital dental models 220-620 (FIGS. 2c-6c) as discussed herein. Various embodiments are well-suited for changes in the gingiva due to a TAD 800 (FIGS. 8a, 8b), or any other type of dental appliance that may cause the gingival to change, as discussed herein.

Figure 1D:
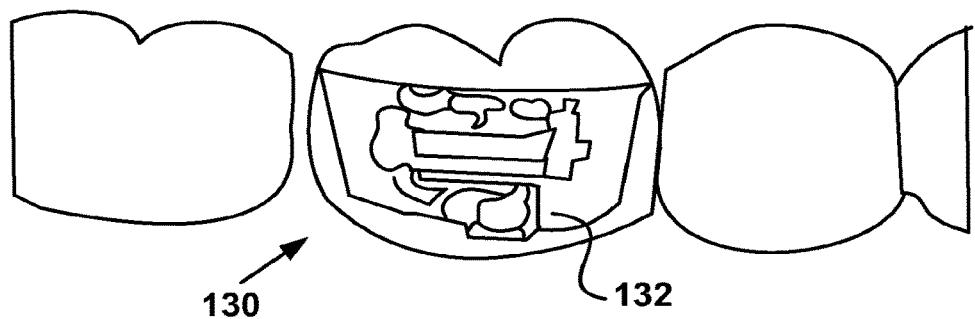
Figure 1E:
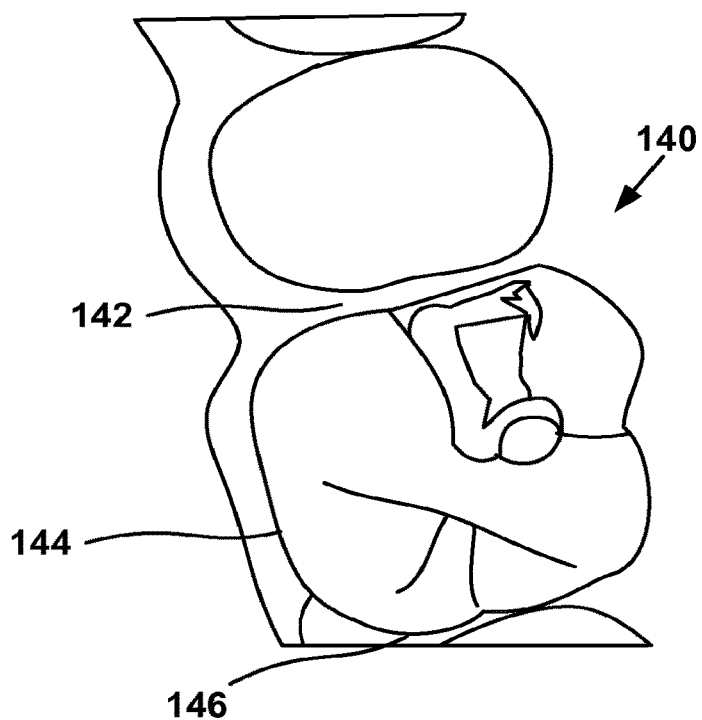
FIG. 1e illustrates a patient's physical teeth after the removal of an orthodontic band, according to one embodiment.
Figure 1F:
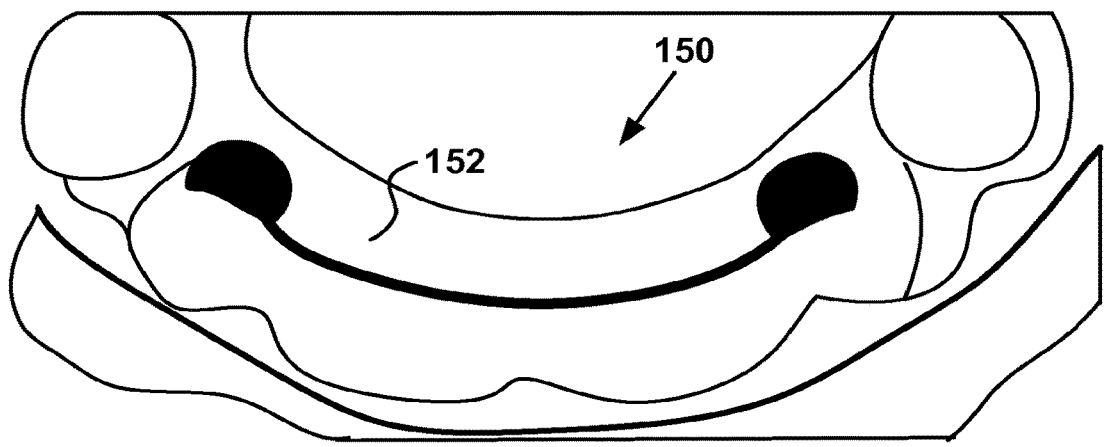
Figure 1G:
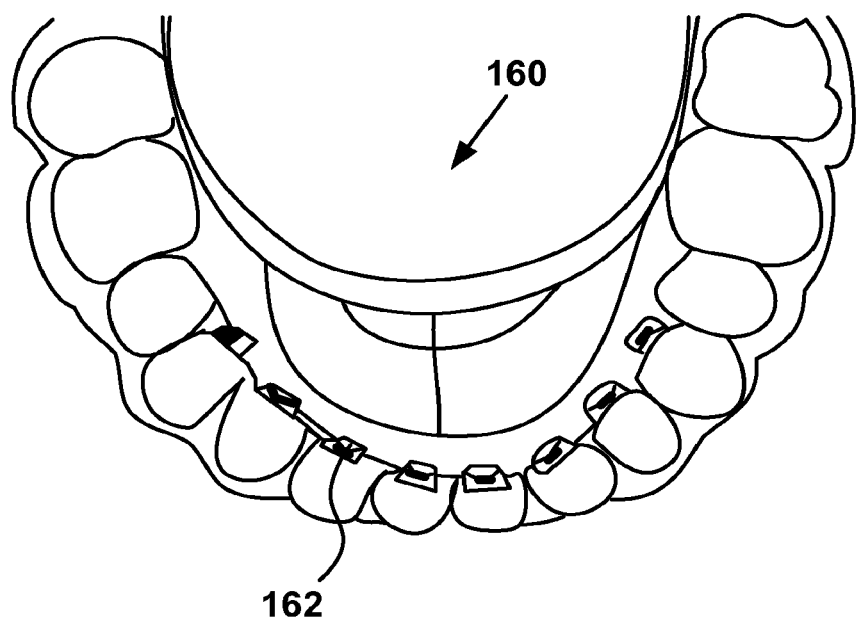

According to one embodiment, the physical teeth 100 (FIG. 1a) are close but not at the desired teeth arrangement when the current digital dental model 210 (FIGS. 2b-6b) is created. Therefore, according to one embodiment, when the current digital dental model 210 (FIGS. 2b-6b) is created when the patient's physical teeth 100 are close but not at the desired teeth arrangement, positions of one or more digital teeth in the new digital dental model 220-620 (FIGS. 2c-6c) are adjusted to the desired teeth arrangement. According to one embodiment, there may be an interproximal space between two physical teeth 100 due to a feature of the current dental appliance 112, 122, 132, 152, 162, 800 (FIGS. 1b, 1c, 1d, 1f, 1g, 8a, 8b), such as an orthodontic band 132 (FIG. 1d). Information pertaining to one or more dimensions of the feature or descriptions of the feature can be used to determine how to adjust the positions of the one or more digital teeth in the new digital dental model 220-620 (FIGS. 2c-6c). A subsequent dental appliance that is manufactured based on a new digital dental model 220-620 (FIGS. 2c-6c) adjusted to the desired teeth arrangement can be used to move the physical teeth 100 (FIG. 1a) to the desired teeth arrangement. A digital tooth's 3D coordinates can be used as a part of adjusting positions, as discussed herein. According to one embodiment, the current digital dental model 210 (FIGS. 2b-6b) and the new digital dental model 220-620 (FIGS. 2c-6c) include digital teeth that each correspond to one of the patient's physical teeth 100a-100b (FIG. 1a).

At 1040, digital data suitable for use in manufacturing the subsequent dental appliance is provided based on electronic data included in the new digital dental model 220-620 (FIGS. 2c-6c) prior to removal of the current dental appliance 112, 122, 132, 152, 162, 800, 820 (FIGS. 1b, 1c, 1d, 1f, 1g, 8a, 8b) from the set of physical teeth 100 or the oral cavity 810a, 810b (FIGS. 1a, 8a, 8b). Examples of a subsequent dental appliance are a retainer, an (active) aligner, a splint, an expander, or a positioner. The retainer may be a Hawley, an Essix-type retainer, a bonded wire, a vacuum-formed stent, spring-retainer type, a clear splint type, or a combination thereof. In the event that treatment is a combination between braces and removable aligners, the subsequent device may be a clear removable aligner or series of aligners similar to a retainer, but designed to continue with orthodontic movement of the teeth. At least one example of a splint is an orthognathic surgery splint, among others. According to one embodiment, 1040 is optional.

At 1050, the method ends. The receiving at 1020 and the creating at 1030 are performed by one or more computer processors, according to one embodiment. Although specific operations are disclosed in flowchart 1000, such operations are exemplary. That is, embodiments of the present invention are well-suited to performing various other operations or variations of the operations recited in flowchart 1000. It is appreciated that the operations in flowchart 1000 may be performed in an order different than presented, and that not all of the operations in flowchart 1000 may be performed.

According to one embodiment, a subsequent dental appliance can be manufactured based on the provided digital data, such as electronic data included in the new digital dental model, prior to removal of all or part of the current dental appliance from the set of physical teeth. For example, the electronic data included in the new digital dental model can be used to fabricate a mold using a rapid-prototyping machine or milling machine and forming the subsequent dental appliance over the mold.

Figure 16:
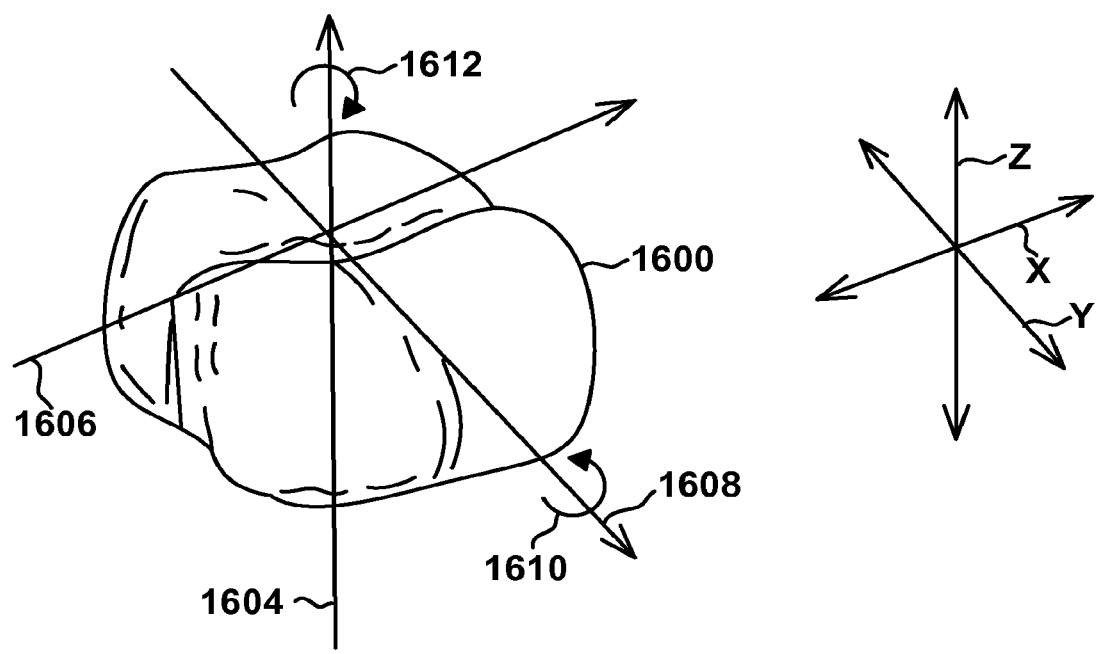
FIG. 16 depicts a digital tooth 1600 that represents one of the patient's set of physical teeth that may be moved from one position of treatment to another position of treatment, according to one embodiment.

FIG. 16 depicts a digital tooth 1600 that represents one of the patient's set of physical teeth that may be moved from one position of treatment to another position of treatment, according to one embodiment. According to one embodiment, the digital tooth 1600 represents a segmented or partially segmented digital tooth, that has one or more axes and three dimensional (3D) coordinates so that the digital tooth 1600 can be freely positioned in 3D space. For example, the 3D coordinates x, y, and z alone or 3D coordinates x, y, and z in combination with one or more axes 1604, 1606, 1608 can be used for positioning the digital tooth 1600.

As a frame of reference describing how a digital tooth 1600 may be moved, an arbitrary centerline (CL) may be drawn through the digital tooth 1600. With reference to this centerline (CL), a tooth 1600 may be moved in orthogonal directions represented by axes 1604, 1606, and 1608 (where 1604 is the centerline). The centerline may be rotated about the axis 1608 (root angulation) and the axis 1604 (torque) as indicated by arrows 1610 and 1612, respectively. Additionally, the tooth 1600 may be rotated about the centerline, as represented by an arrow 1612. Thus, all possible free-form motions of the tooth 1600 can be performed.

Figure 17:
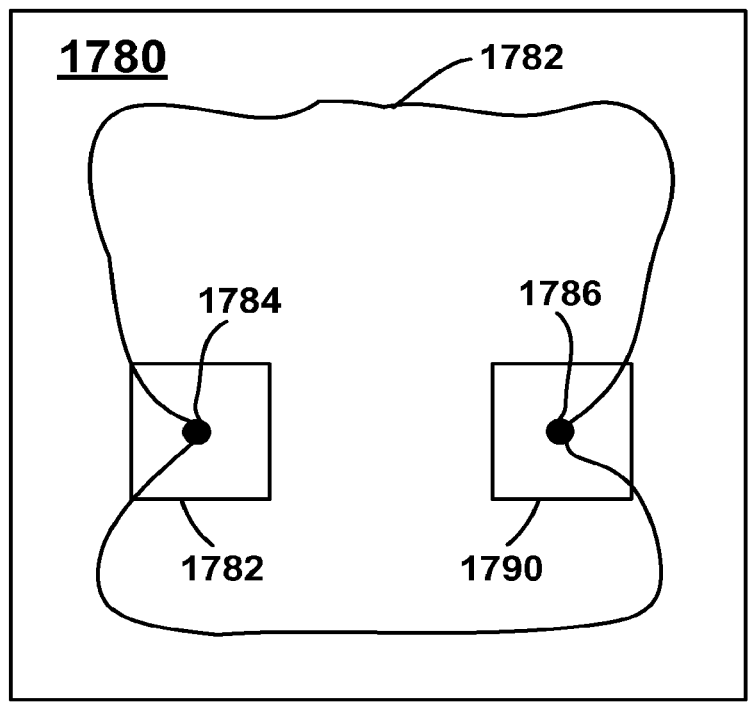
FIGS. 17-19 illustrate a technique for identifying the gingival margin that defines the boundary between tooth and gum in the patient's dentition and simulating changes in the gingiva, according to one embodiment.
Figure 19:
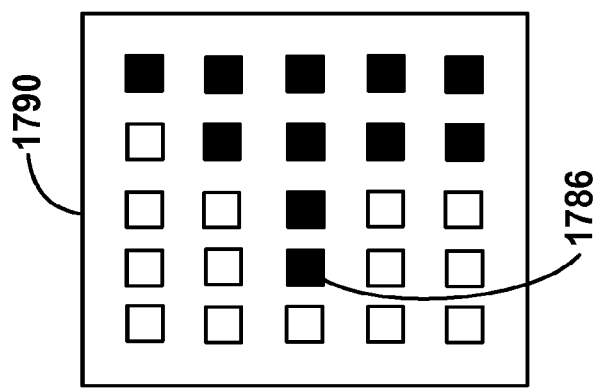
Figure 18:
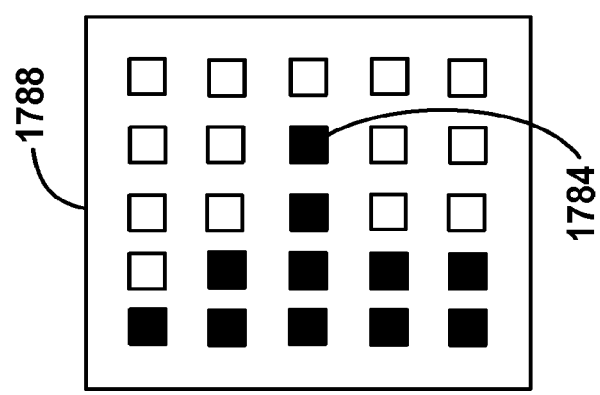

FIGS. 17-19 illustrate a technique for identifying the gingival margin that defines the boundary between tooth and gum in the patient's dentition and simulating changes in the gingiva, according to one embodiment. This technique involves the creation of a series of horizontal 2D-planes 1780, or slices, that intersect the dentition model roughly perpendicular to the occlusal plane. The cross-sectional surface 1782 of the dentition model in each of these planes 1780 includes cusps 1784, 1786 that represent the gingival margin. The computer identifies the gingival margin by applying one or more of the cusp detection techniques described above.

One technique is very similar to the neighborhood filtered cusp detection technique described above, in that voxel neighbrhoods 1788, 1790 are defined on one of the 2D-planes to focus the computer's search for cusps on adjacent 2D plane. Upon detecting a pair of cusps 1784, 1786 on one 2D plane, the computer defines one or more neighborhoods 1788, 1790 to include predetermined number of voxels surrounding the pair. The computer projects the neighborhoods onto an adjacent 2D plane by identifying the voxels on the adjacent plane that correspond to the voxel in the neighborhoods 1788, 1790 on the original plane. The computer then identifies the pair of black voxels that lie closest together in the two neighborhoods on the adjacent plane, labeling these voxels as lying in the cusp. The computer repeats this process for all remaining planes.

Many of these automated segmentation techniques are even more useful and efficient when used in conjunction with human-assisted techniques. For example, techniques that rely on the identification of the interproximal or gingival margins function more quickly and effectively when a human user first highlights the interproximal or gingival cusps in a graphical representation of the dentition model. One technique for receiving this type of information from the user is by displaying a 2D or 3D representation and allowing the user to highlight individual voxels in the display. Another technique allows the user to scroll through a series of 2D cross-sectional slices, identifying those voxels that represent key features such as interproximal or gingival cusps. Some of these techniques rely on user interface tools such as cursors and bounding-box markers.

In many instances, the computer creates proposals for segmenting the dentition model and then allows the user to select the best alternative. For example, one version of the arch curve fitting technique requires the computer to create a candidate catenary or spline curve, which the user allowed to modify by manipulating the mathematical control parameters. One technique involves displaying several surfaces that are candidates cutting surfaces and allowing the user to select the appropriate surfaces.

According to one embodiment, a tangible computer readable storage medium having computer-executable instructions stored thereon for causing a computer system to perform a method of creating a subsequent dental appliance prior to removal of a current dental appliance 112, 122, 132, 152, 162, 820 (FIGS. 1b, 1c, 1d, 1f, 1g, 8b) from a set of physical teeth 100 (FIG. 1a) for a patient is provided. According to one embodiment, the tangible computer readable storage medium provides for receiving 1020 a current digital dental model 210 (FIG. 2b-6b) that includes a representation of the set of physical teeth 100 (FIG. 1a) for the patient with the current dental appliance 112, 122, 132, 152, 162, 800, 820 (FIGS. 1b, 1c, 1d, 1f, 1g, 8a, 8b) attached to the physical teeth 100 or oral cavity 810a, 810b (FIGS. 8a, 8b), where the current digital dental model 210 is a direct digital scan of the set of physical teeth 100 and the current dental appliance 112, 122, 132, 152, 162, 800, 820 and wherein the physical teeth 100 are at a position in treatment when all or a part of the current dental appliance 112, 122, 132, 152, 162, 800, 820 is desired to be removed from one or more of the set of physical teeth 100 and it is desired to use a subsequent appliance.

According to one embodiment, the creating 1030 (FIG. 10) is computer automated. According to one embodiment, the new digital dental model 220-620 (FIGS. 2c-6c) includes electronic data suitable for manufacturing of the subsequent dental appliance prior to removal of the current dental appliance 112, 122, 132, 152, 162, 800, 820 (FIGS. 1b, 1c, 1d, 1f, 1g, 8a, 8b) from the set of physical teeth 100 (FIG. 1a) or oral cavity 810a, 810b (FIGS. 8a, 8b).

A new digital dental model 220-620 (FIGS. 2c-6c), according to various embodiments, provides for more quickly, more cheaply making subsequent dental appliances that fit the patient's physical teeth and gingiva better. A new digital dental model 220-620 (FIGS. 2c-6c), according to various embodiments, provides for increased patient compliance (due to improved appliance comfort when worn, for example) and reduced chance of relapse as a result. A new digital dental model 220-620 (FIGS. 2c-6c), according to various embodiments, significantly reduces the chance of relapse because the subsequent digital appliance is made from the new digital dental model 220-620 (FIGS. 2c-6c) while the current dental appliance is still attached to the patient's physical teeth. Further, the subsequent digital appliance can be applied immediately upon removal of the current dental appliance. Further, a new digital dental model 220-620 (FIGS. 2c-6c) can be created without using physical impressions or without requiring the use of physical impressions and associated processes such as blocking out the teeth with wax, for example, prior to taking the impression. A new digital dental model 220-620 (FIGS. 2c-6c), according to various embodiments, reduces the number of patient appointments and/or additional appliances needed, or a combination thereof in comparison to methods involving physical impressions, since the appliance removal and subsequent appliance delivery can be combined into one appointment. Furthermore, a new digital dental model 220-620 (FIGS. 2c-6c) is not subject to the distortions that can occur while making a manual impression, so the risk of remaking the appliance and the additional time and effort associated due to poor subsequent appliance fit is reduced. The teeth are less likely to undergo a period of time without orthodontic restraint, as would be the case if the braces were removed and a period of time allowed to lapse before the retainer is delivered. A transitional dental appliance to prevent movement during this interim period becomes no longer needed, since the doctor can smoothly transition between braces and the subsequent dental appliance.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments have been described in various combinations and illustrations. However, any two or more embodiments or features may be combined. Further, any embodiment or feature may be used separately from any other embodiment or feature. Phrases, such as "an embodiment," "one embodiment," among others, used herein, are not necessarily referring to the same embodiment. Features, structures, or characteristics of any embodiment may be combined in any suitable manner with one or more other features, structures, or characteristics.

What is claimed is:

1. A method for designing a subsequent dental appliance comprising:
   superimposing a first digital model on a second digital model,
      wherein the first digital model represents a patient's teeth with a current dental appliance attached to the patient's teeth, and
      wherein the second digital model represents at least a portion of the current dental appliance;
   determining a superimposed portion of the first digital model relative to the second digital model based on the superimposing;

generating a new digital tooth model by removing the superimposed portion from the first digital model;

adjusting the new digital tooth model by moving the positions of one or more representations of the patient's teeth to target tooth positions; and designing the subsequent dental appliance based on the new digital tooth model, wherein the subsequent dental appliance is designed to move the patient's teeth toward the target tooth positions.

2. The method of claim 1, wherein the second digital model represents the entire current dental appliance.

3. The method of claim 1, further comprising generating instructions for fabrication of the subsequent dental appliance.

4. The method of claim 3, further comprises fabricating the subsequent dental appliance using a rapid-prototyping machine.

5. The method of claim 1, wherein the first digital model is created using a direct digital scan of the patient's teeth with the current dental appliance attached to one or more of the patient's teeth.

6. The method of claim 1, wherein generating the new digital tooth model involves a computer automated process.

7. The method of claim 1, wherein the new digital tooth model includes a portion of the patient's gingiva.

8. The method of claim 1, further comprising simulating one or more changes in the patient's gingiva.

9. The method of claim 1, further comprising receiving an image of the current dental appliance when not attached to the patient's teeth and using the image to generate the second digital model.

10. The method of claim 1, further comprising receiving an image of a dental appliance that is the same or similar type of dental appliance as the current dental appliance and using the image to generate the second digital model.

11. A non-transitory computing device readable medium storing instructions executable by a processor to cause a computing device to perform a method for designing a subsequent dental appliance, the method comprising:

superimposing a first digital model on a second digital model, wherein the first digital model represents a patient's teeth with a current dental appliance attached to the patient's teeth, and wherein the second digital model represents at least a portion of the current dental appliance;

determining a superimposed portion of the first digital model relative to the second digital model based on the superimposing;

generating a new digital tooth model by removing the superimposed portion from the first digital model;

adjusting the new digital tooth model by moving the positions of one or more representations of the patient's teeth to target tooth positions; and designing the subsequent dental appliance based on the new digital tooth model, wherein the subsequent dental appliance is designed to move the patient's teeth toward the target tooth positions.

12. The non-transitory computing device readable medium of claim 11, wherein the second digital model represents the entire current dental appliance.

13. The non-transitory computing device readable medium of claim 11, wherein the performed method further comprises the step of generating instructions for fabrication of the subsequent dental appliance.

14. The non-transitory computing device readable medium of claim 13, wherein the performed method further comprises fabricating the subsequent dental appliance using a rapid-prototyping machine.

15. The non-transitory computing device readable medium of claim 11, wherein the first digital model is created using a direct digital scan of the patient's teeth with the current dental appliance attached to one or more of the patient's teeth.

16. The non-transitory computing device readable medium of claim 11, wherein generating the new digital tooth model involves a computer automated process.

17. The non-transitory computing device readable medium of claim 11, wherein the new digital tooth model includes a portion of the patient's gingiva.

18. The non-transitory computing device readable medium of claim 11, wherein the performed method further comprises simulating one or more changes in the patient's gingiva.

19. The non-transitory computing device readable medium of claim 11, wherein the performed method further comprises receiving an image of the current dental appliance when not attached to the patient's teeth and using the image to generate the second digital model.

20. The non-transitory computing device readable medium of claim 11, wherein the performed method further comprises receiving an image of a dental appliance that is the same or similar type of dental appliance as the current dental appliance and using the image to generate the second digital model.

* * * * *